United States Patent
Chu et al.

(10) Patent No.: US 10,237,891 B1
(45) Date of Patent: Mar. 19, 2019

(54) MULTIPLE BASIC SERVICE SET SUPPORT

(71) Applicant: Marvell International Ltd., Hamilton (BM)

(72) Inventors: Liwen Chu, San Ramon, CA (US); Lei Wang, San Diego, CA (US); Jinjing Jiang, San Jose, CA (US); Hongyuan Zhang, Fremont, CA (US); Yakun Sun, San Jose, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 23 days.

(21) Appl. No.: 15/438,732

(22) Filed: Feb. 21, 2017

Related U.S. Application Data

(60) Provisional application No. 62/394,999, filed on Sep. 15, 2016, provisional application No. 62/298,051, filed on Feb. 22, 2016.

(51) Int. Cl.
*H04W 74/00* (2009.01)
*H04L 29/08* (2006.01)
*H04W 88/10* (2009.01)

(52) U.S. Cl.
CPC ......... *H04W 74/002* (2013.01); *H04L 67/303* (2013.01); *H04W 88/10* (2013.01)

(58) Field of Classification Search
None
See application file for complete search history.

(56) References Cited

U.S. PATENT DOCUMENTS

2008/0144591 A1* 6/2008 Jokela ................ H04W 48/12
370/338
2010/0020746 A1* 1/2010 Zaks ................... G06Q 30/02
370/328

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless Lan Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Candal Elpenord

(57) ABSTRACT

A method for identifying association identifiers (AIDs) for multiple basic service sets (BSSs) supported by a first communication device is described. A reference identifier that indicates a fixed mapping of AIDs to BSS identifiers (BSSIDs) in a multiple-BSSID set is identified by a first communication device. The multiple-BSSID set includes BSSIDs of a first and second BSS. A management frame that includes a maximum BSSID indicator that indicates a maximum size of the multiple-BSSID set, the reference identifier, and a transmitter address of the management frame is generated for a receiver of the management frame to derive a first AID corresponding to the first BSS and a second AID corresponding to the second BSS based on the maximum BSSID indicator, the reference identifier, and the transmitter address. The management frame is transmitted to at least one second communication device associated with one of the first BSS and the second BSS.

26 Claims, 11 Drawing Sheets

(56) References Cited

U.S. PATENT DOCUMENTS

| | | | | |
|---|---|---|---|---|
| 2016/0014804 A1* | 1/2016 | Merlin | ................ | H04L 5/0044 370/329 |
| 2017/0012791 A1* | 1/2017 | Stacey | ................ | H04L 12/189 |
| 2017/0105143 A1* | 4/2017 | Seok | .................... | H04W 28/06 |

OTHER PUBLICATIONS

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std. 802.11n™ "IEEE Standard for Information Technology—Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11ac™-2013 "IEEE Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-425 (Dec. 18, 2013).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

U.S. Appl. No. 16/247,451, Chu et al., "Multiple Basic Service Set Support," filed Jan. 14, 2019.

* cited by examiner

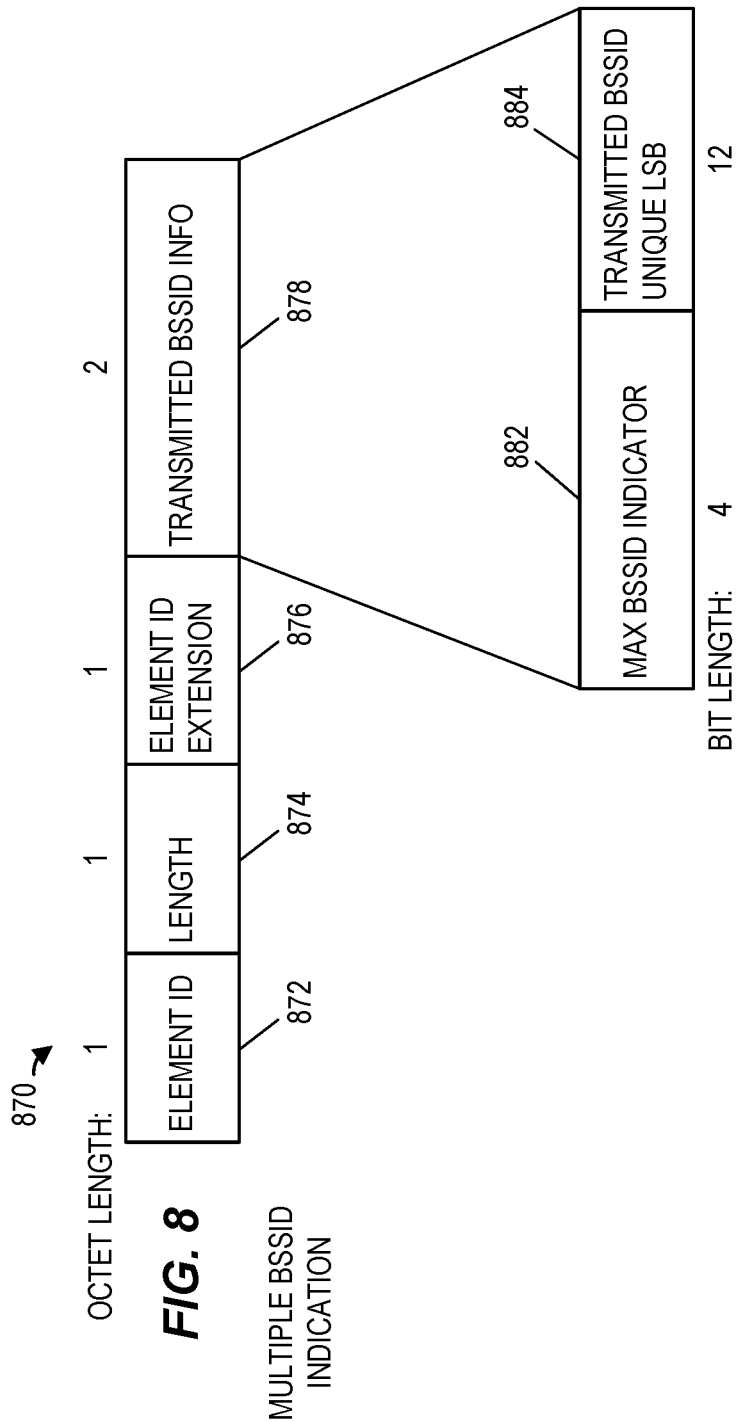

MULTIPLE BASIC SERVICE SET SUPPORT

CROSS-REFERENCES TO RELATED APPLICATIONS

This disclosure claims the benefit of U.S. Provisional Patent Application No. 62/298,051, entitled "Multiple BSSID Support" and filed on Feb. 22, 2016, U.S. Provisional Patent Application No. 62/394,999, entitled "Multiple BSSID Support" and filed on Sep. 15, 2016, the disclosures of each of which are incorporated herein by reference in their entireties.

FIELD OF THE DISCLOSURE

The present disclosure relates generally to communication networks and, more particularly, to multi-user data units for multiple basic service sets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technologies is described in detail in the IEEE 802.11 Standards, including for example, the IEEE Standards 802.11a, 802.11b, 802.11g, and 802.11n and their updates and amendments, as well as the IEEE Standard 802.11ac now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In an embodiment, a method for identifying association identifiers (AIDs) for multiple basic service sets (BSSs) supported by a first communication device includes identifying, by the first communication device, a reference identifier that indicates a fixed mapping of AIDs to basic service set identifiers (BSSIDs) in a multiple-BSSID set. The multiple-BSSID set includes BSSIDs of a first BSS and a second BSS of the multiple BSSs supported by the first communication device. The method includes generating, by the first communication device, a management frame that includes i) a maximum BSSID indicator that indicates a maximum size of the multiple-BSSID set, ii) the reference identifier, and iii) a transmitter address of the management frame for a receiver of the management frame to derive a first AID corresponding to the first BSS and a second AID corresponding to the second BSS based on i) the maximum BSSID indicator, ii) the reference identifier, and iii) the transmitter address of the management frame. The method also includes transmitting, by the first communication device, the management frame to at least one second communication device associated with one of the first BSS and the second BSS.

In another embodiment, a first communication device for identifying association identifiers (AIDs) for multiple basic service sets (BSSs) supported by the first communication device includes a network interface device having one or more integrated circuits. The one or more integrated circuits are configured to identify a reference identifier that indicates a fixed mapping of AIDs to basic service set identifiers (BSSIDs) in a multiple-BSSID set. The multiple-BSSID set includes BSSIDs of a first BSS and a second BSS of the multiple BSSs supported by the first communication device. The one or more integrated circuits are configured to generate a management frame that includes i) a maximum BSSID indicator that indicates a maximum size of the multiple-BSSID set, ii) the reference identifier, and iii) a transmitter address of the management frame, for a receiver of the management frame to derive a first AID corresponding to the first BSS and a second AID corresponding to the second BSS based on i) the maximum BSSID indicator, ii) the reference identifier, and iii) the transmitter address of the management frame. The one or more integrated circuits are configured to transmit the management frame to at least one second communication device associated with one of the first BSS and the second BSS.

In an embodiment, a method for identifying respective association identifiers (AIDs) for multiple basic service sets (BSSs) supported by a first communication device includes receiving, at a second communication device, a management frame that is transmitted by the first communication device. The management frame includes i) a reference identifier indicating a fixed mapping of AIDs to basic service set identifiers (BSSIDs) in a multiple-BSSID set, ii) a maximum BSSID indicator that indicates a maximum size of the multiple-BSSID set, and iii) a transmitter address of the management frame. The multiple-BSSID set includes a first BSSID of a first BSS and a second BSSID of a second BSS of the multiple BSSs supported by the first communication device. The second communication device is associated with the second BSS and is not associated with the first BSS. The method includes deriving, by the second communication device, a first AID corresponding to the first BSS and a second AID corresponding to the second BSS based on i) the maximum BSSID indicator, ii) the reference identifier, and iii) the transmitter address of the management frame. The transmitter address corresponds to the first BSSID. The method also includes monitoring, by the second communication device, for management frames and control frames that i) are intended for the second communication device, ii) are transmitted after the management frame, and iii) have a broadcast address corresponding to one of the first AID and the second AID.

BRIEF DESCRIPTION OF THE DRAWINGS

FIG. 8 is a diagram of an example multiple BSSID indication element, according to an embodiment.

DETAILED DESCRIPTION

Figure 1:
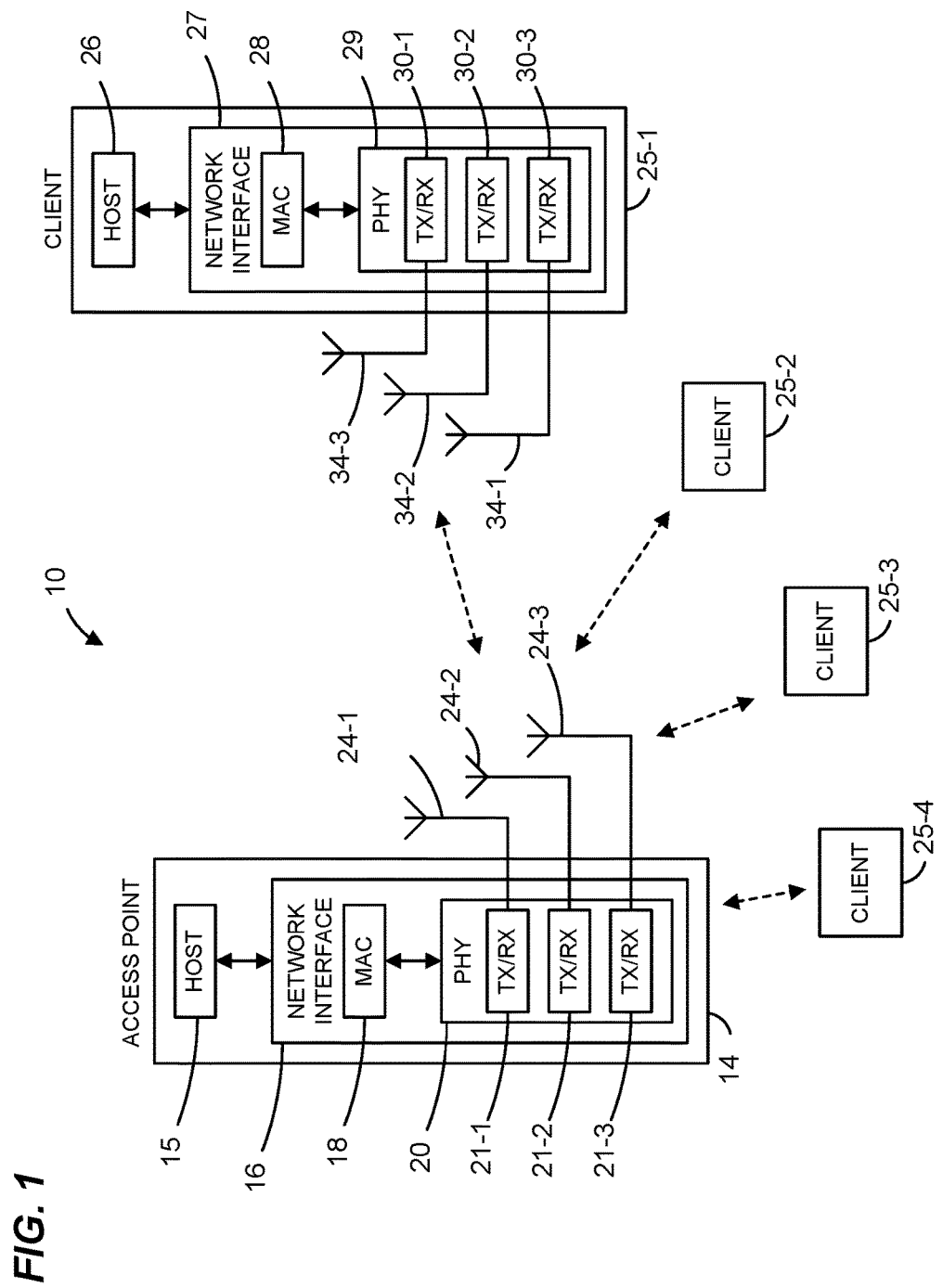
FIG. 1 is a block diagram of an example wireless local area network (WLAN), according to an embodiment.

In various embodiments and scenarios described below, a wireless network device such as an access point (AP) device of a wireless local area network (WLAN) supports multiple basic service sets (BSSs) for multiple client stations. In some scenarios, the AP device supports and announces multiple APs. In the description provided herein, reference is made to "virtual access points", "virtual APs" or "VAPs" which represent the BSSs (created by different virtual APs) corresponding to the multiple BSSs that are supported by a same AP device. The multiple virtual APs are identified by a multiple basic service set identifier (BSSID) element transmitted in Beacon frames by the AP device. Client stations (STAs) associated with multiple virtual APs can receive data units from multiple virtual APs in a downlink (DL) multi-user (MU) transmission and can transmit data units to multiple virtual APs in an uplink (UL) MU transmission. In order to do this, one of the virtual APs generates management frames and control frames for transmission to client stations associated with multiple virtual APs, for example, beacon frames, probe response frames, association response frames, and trigger frames, in an embodiment. The broadcast data frames, management frames, and control frames transmitted by one virtual AP can be received by STAs associated with multiple virtual APs. In various embodiments and/or scenarios, the data frames, management frames, and control frames that are destined for (i.e., intended to be received by) STAs associated with multiple virtual APs include a transmit address (TA) (e.g., a media access control (MAC) address) which is the BSSID of the transmitted Beacons (e.g., a "transmitted BSSID"). In various embodiments and/or scenarios, the data frames, management frames, and control frames that are destined to STAs associated with one virtual AP include transmit MAC address (TA) which is the BSSID of the virtual AP.

In various embodiments and/or scenarios, the broadcast data frames, management frames, and control frames in DL MU physical layer (PHY) protocol data units (PPDU) (DL MU multiple input multiple output, DL orthogonal frequency division multiple access) are in broadcast resource units which are identified by association identifiers (AIDs) that identify the client stations that are intended receivers of the frames or intended receivers of subsequent frames. In an embodiment, for example, the virtual AP selects or identifies different AID values to identify individual client stations or groups of client stations (i.e., the group of client stations associated with a particular BSS, the group of client stations associated with multiple BSS, or unassociated client stations). In an embodiment, the virtual AP identifies a first AID for the group of client stations associated with a first BSS and provides the first AID to the group of client stations (or client stations that may associate with the first BSS). In an embodiment, the virtual AP identifies AID 2047 for the group of client stations associated with multiple BSS.

In some embodiments and/or scenarios, only one of the virtual APs generates beacon frames that include or identify different AIDs for multiple BSSs defined by a multiple BSSID set supported by the AP device. With this implementation, management overhead can be reduced. In an embodiment, for example, one of the virtual APs generates beacons frame that utilize a Multiple BSSID element to provide profile information for a transmitted BSSID (e.g., the BSSID corresponding to a transmitter address for the beacon frame) and one or more nontransmitted BSSID, which are those BSSIDs that are not announced explicitly by the beacon frames but can be derived from the information encoded in the beacon frame. In this embodiment, a traffic indication map (TIM) element of the beacon frame identifies the AIDs for the multiple BSSs utilizing the transmitter address (i.e., the transmitted BSSID) as a reference BSSID, where the reference BSSID has a particular AID value (e.g., an AID value of zero, or AID0). With this scenario, a STA which does not support the Multiple BSSID element cannot determine the virtual APs which are identified by nontransmitted BSSIDs, so the STA cannot associate with any of the virtual APs which are identified by nontransmitted BSSIDs. In order to solve such issue, there are other scenarios where multiple virtual APs owned by an AP device transmit Beacons. However, in the scenarios where multiple virtual APs transmit Beacons, the mapping of AID values to the multiple BSSs is also different and thus more difficult for a receiver to derive.

In various embodiments described below, a communication device (e.g., an access point, client station, or any other suitable network device) utilizes a fixed mapping of AIDs to BSSIDs in a multiple BSSID set supported by the communication device. In an embodiment, the fixed mapping is indicated by a reference identifier of a management frame that allows multiple AIDs to be derived by a receiver of the management frame. In some embodiments, the communication device generates and transmits multiple management frames having different transmitter addresses corresponding to different BSSIDs of the virtual APs, with each management frame indicating the same fixed mapping. In an embodiment, a receiver of the management frame derives a first AID and a second AID from the fixed mapping and monitors for management and control frames transmitted after the management frame that have a broadcast address corresponding to either of the first AID or the second AID.

FIG. 1 is a block diagram of an example wireless local area network (WLAN) 10, according to an embodiment. An AP 14 includes a host processor 15 coupled to a network interface 16 (or "network interface device"). In an embodiment, the network interface 16 includes one or more integrated circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27 (or "network interface device"). In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

Figures 2A, 2B:
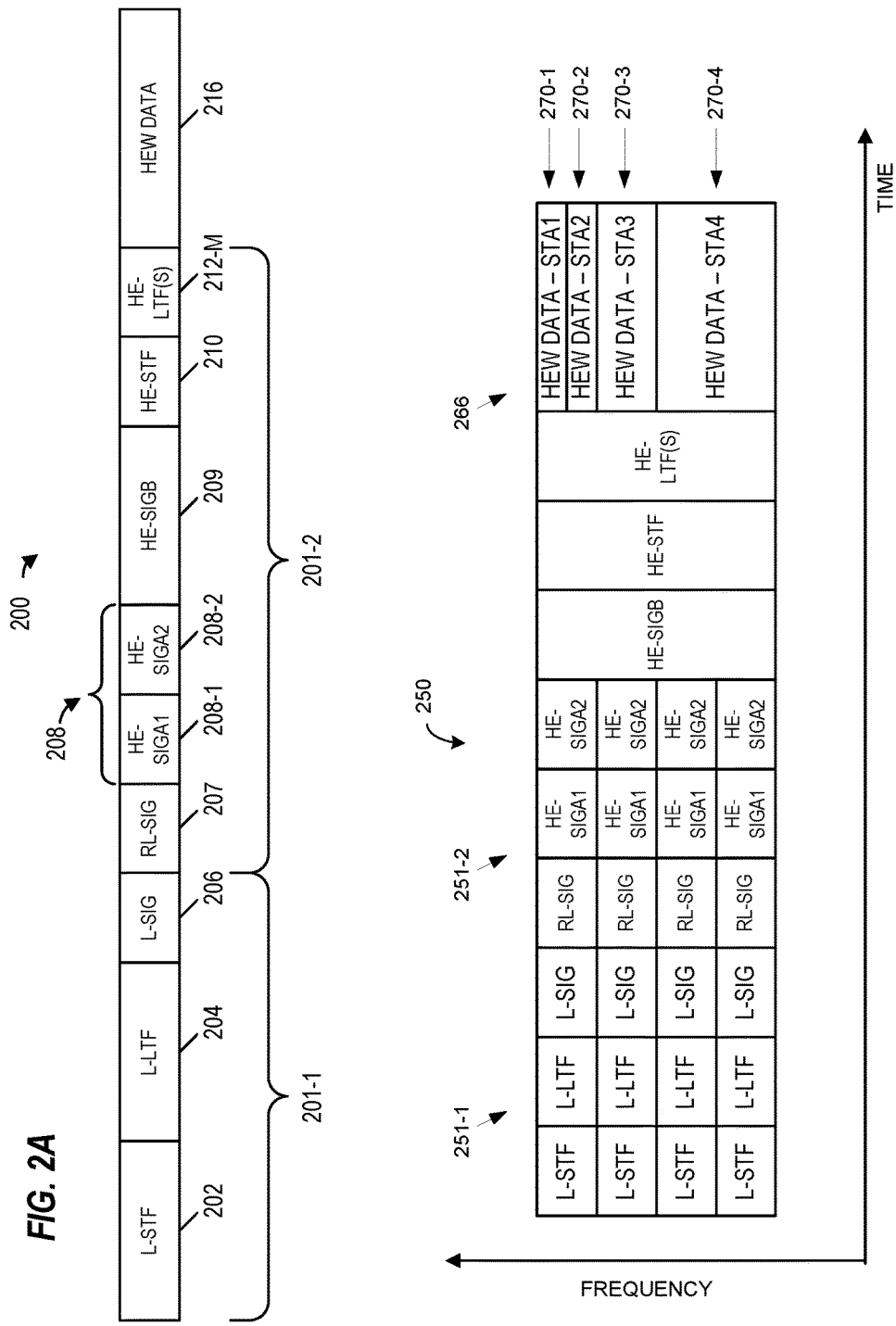
FIG. 2A is a diagram of an example orthogonal frequency division multiplexing (OFDM) data unit, according to an embodiment.
FIG. 2B is a diagram of an example orthogonal frequency division multiple access (OFDMA) data unit, according to an embodiment.

FIG. 2A is a diagram of an example orthogonal frequency division multiplexing (OFDM) data unit 200, according to an embodiment. The OFDM data unit 200 is a physical layer (PHY) data unit of the first communication protocol (High Efficiency, HE, or 802.11ax communication protocol), in an embodiment. The AP 14 is configured to transmit the OFDM data unit 200 to the client station 25-1 or the client stations via OFDM modulation, according to an embodiment. In an embodiment, the client station 25-1 is also configured to transmit the data unit 200 to the AP 14. In some embodiments, the data unit 200 conforms to the first communication protocol and occupies a 20 MHz bandwidth. Data units that conform to the first communication protocol similar to the data unit 200 may occupy other suitable bandwidths such as 2 MHz, 5 MHz, 10 MHz, 40 MHz, 80 MHz, 160 MHz, 320 MHz, 640 MHz, etc., for example, or other suitable bandwidths, in other embodiments. The data unit 200 is suitable for "mixed mode" situations, i.e., when the WLAN 10 includes a client station (e.g., the legacy client station 25-4) that conforms to a legacy communication protocol, but not the first communication protocol. The data unit 200 is utilized in other situations as well, in some embodiments.

In an embodiment, the data unit 200 includes a preamble 201 having an L-STF 202, an L-LTF 204, an L-SIG 206, a repeated legacy signal (RL-SIG) field 207 that follows the L-SIG 206, two first HE signal fields (HE-SIGAs) 208 including a first HE signal field (HE-SIGA1) 208-1 and a second HE signal field (HE-SIGA2) 208-2, a third HE signal field (HE-SIGB) 209, a HE short training field (HE-STF) 210, and M HE long training fields (HE-LTFs) 212. In an embodiment, the preamble 201 includes a legacy portion 201-1, including the L-STF 202, the L-LTF 204, and the L-SIG 206, and a non-legacy portion 201-2, including the RL-SIG 207, HE-SIGAs 208, HE-SIGB 209, HE-STF 210, and M HE-LTFs 212.

Each of the L-STF 202, the L-LTF 204, the L-SIG 206, the HE-SIGAs 208, the HE-SIGB 209, the HE-STF 210, and the M HE-LTFs 212 are included in an integer number of one or more OFDM symbols. For example, in an embodiment, the HE-SIGAs 208 correspond to two OFDM symbols, where the HE-SIGA1 208-1 field is included in the first OFDM symbol and the HE-SIGA2 is included in the second OFDM symbol. In another embodiment, for example, the preamble 201 includes a third HE signal field (HE-SIGA3, not shown) and the HE-SIGAs 208 correspond to three OFDM symbols, where the HE-SIGA1 208-1 field is included in the first OFDM symbol, the HE-SIGA2 is included in the second OFDM symbol, and the HE-SIGA3 is included in the third OFDM symbol. In at least some examples, the HE-SIGAs 208 are collectively referred to as a single HE signal field (HE-SIGA) 208. In some embodiments, the data unit 200 also includes a data portion 216. In other embodiments, the data unit 200 omits the data portion 216 (e.g., the data unit 200 is a null-data packet).

In the embodiment of FIG. 2A, the data unit 200 includes one of each of the L-STF 202, the L-LTF 204, the L-SIG 206, and the HE-SIGA1s 208. In other embodiments in which an OFDM data unit similar to the data unit 200 occupies a cumulative bandwidth other than 20 MHz, each of the L-STF 202, the L-LTF 204, the L-SIG 206, the RL-SIG 207, and the HE-SIGA1s 208 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 202, the L-LTF 204, the L-SIG 206, the RL-SIG 207, and the HE-SIGA1s 208 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

FIG. 2B is a diagram of an example orthogonal frequency division multiple access (OFDMA) data unit 250, according to an embodiment. The OFDMA data unit 250 includes a plurality of OFDM data units (or resource units (RUs)) 270-1, 270-2, 270-3, and 270-4 having independent data streams corresponding to four client stations 25 (STA1, STA2, STA3, and STA4, respectively). In the illustrated embodiment, the OFDMA data unit 250 occupies an 80 MHz bandwidth. In other embodiments, the OFDMA data unit 250 occupies another suitable bandwidth. In an embodiment, each OFDM data unit 270 is the same as or similar to the OFDM data unit 200 of FIG. 2A.

Each of the OFDM data units 270-1, 270-2, 270-3, and 270-4 conforms to a communication protocol that defines OFDMA communication, such as the HE communication protocol, in an embodiment. In an embodiment in which the OFDMA data unit 250 corresponds to a downlink OFDMA data unit, the OFDMA data unit 250 is generated by the AP 14 such that each OFDM data unit 270 is transmitted to a respective client station 25 via a respective sub-channel of the WLAN 10 allocated for downlink transmission of the OFDMA data unit 250 to the client station. Similarly, in an embodiment in which the OFDMA data unit 250 corresponds to an uplink OFDMA data unit, the AP 14 receives the OFDM data units 270 via respective sub-channels of the WLAN 10 allocated for uplink transmission of the OFDM data units 270 from the client stations. For example, the OFDM data unit 270-1 is transmitted via a first 10 MHZ sub-channel of the WLAN 10, the OFDM data unit 270-2 is transmitted via a second 10 MHz sub-channel of the WLAN 10, the OFDM data unit 270-3 is transmitted via a 20 MHz sub-channel of the WLAN 10, and the OFDM data unit 270-4 is transmitted via a 40 MHz sub-channel of the WLAN 10, in the illustrated embodiment. In this embodiment, each of the OFDM data units 270-1, 270-2 occupies a respective sub-channel having a bandwidth that is less than a smallest channel of the WLAN 10. For example, the smallest channel of the WLAN 10 is 20 MHz, and each of OFDM data units 270-1, 270-2 occupies a respective sub-channel having a bandwidth of 10 MHz, in an embodiment. The OFDM data units 270-1 and 270-2 collectively span the smallest bandwidth channel of the WLAN 10, in an embodiment.

In an embodiment, each of the OFDM data units 270 includes a legacy preamble 251-1 (e.g., including one or more L-STF fields 202, L-LTF fields 204, and/or L-SIG fields 206) and a non-legacy (e.g., HE) preamble 251-2 (e.g., including one or more RL-SIG fields 207, HE-SIGA fields 208, HE-SIGB fields 209, HE-STF fields 210, and/or HE-LTF fields 212). Additionally, each OFDM data unit 270 includes a high efficiency WLAN data portion (HE-DATA) 266. In an embodiment, HE-DATA 266 is an A-MPDU which aggregates one or more of data frames, management frames, and control frames or A-MPDUs (single data frame, single management frame, or single control frame) In some embodiments, one or more of the data portions 266 are omitted from the corresponding one or more OFDM data units 270 (e.g., for a null data frame). In an embodiment, the content of each of the non-legacy preambles 251-2 can be variant for different client stations depending on factors such as rate, data quantity, configuration (e.g., number of antennas, number of supported multiple input, multiple output (MIMO) data streams, etc.) of the different client stations.

In an embodiment, each L-STF field, L-LTF field, and L-SIG field of the legacy preamble 251-1 occupies a smallest bandwidth supported by the WLAN 10 (e.g., 20 MHz). In an embodiment, if an OFDM data unit 270 occupies a bandwidth that is greater than the smallest bandwidth of the WLAN 10, then each L-STF field, L-LTF field, L-SIG field, RL-SIG, and HE-SIGA field is duplicated in each smallest bandwidth portion of the OFDM data unit 270 (e.g., in each 20 MHz portion of the data unit 270). On the other hand, each HE-SIGB field, HE-STF field, HE-LTF field, and HE data portion occupies an entire bandwidth of the corresponding OFDM data unit 270, in an embodiment. For example, the OFDM data unit 270-4 occupies 40 MHz, wherein the L-STF field, the L-LTF field, the L-SIG field, and HE-SIGA field is duplicated in upper and lower 20 MHz bands of the OFDM data unit 270-4, while each of the HE-SIGB, the HE-STF field, the HE-LTF fields, and HE data portion occupies the entire 40 MHz bandwidth of the data unit 270-4, in the illustrated embodiment.

In some embodiments, padding is used in one or more of the OFDM data units 270 to equalize lengths of the OFDM data units 270. Accordingly, the length of each of the OFDM data units 270 is padded as needed to correspond to the length of the OFDMA data unit 250, in this embodiment. Ensuring that the OFDM data units 270 are of equal lengths synchronizes transmission of acknowledgment frames by client stations 25 that receive the data units 270, in an embodiment. In an embodiment, one or more of the OFDM data units 270 is an aggregate MAC service data units (A-MPDU) (e.g., a very high throughput (VHT) A-MPDU that includes multiple aggregated VHT MAC service data units (MPDUs), an HE A-MPDU that includes multiple aggregated HE MAC service data units (MPDUs), or another suitable aggregated data unit that includes multiple aggregated MAC service data units (MPDUs)), which is in turn included in a PHY protocol data unit (PPDU). In another embodiment, one or more of the OFDM data units 270 is a single MPDU (e.g., a single VHT MPDU, a single HE MPDU, or another suitable non-aggregated data unit) which is in turn included in a PPDU. In an embodiment, padding (e.g., zero-padding) within one or more of the A-MPDUs 270 or single MPDUs 270 is used to equalize the lengths of the data units 270, and to synchronize transmission of acknowledgment frames corresponding to the OFDMA data unit 250.

In an embodiment, the OFDM data units 270-1 and 270-2 share a legacy preamble 251-1 that occupies the smallest bandwidth of the WLAN 10 (e.g., 20 MHz) collectively spanned by the OFDM data units 270-1 and 270-2. In this embodiment, each of the OFDM data units 270-1 and 270-2 includes a respective HE preamble 251-2 and a respective data portion 266 that each spans a bandwidth smaller than the smallest channel of the WLAN 10 (e.g., 10 MHz, 5 MHz, 2 MHz, or other suitable bandwidth). In the illustrated embodiment, the OFDM data units 270-1 and 270-2 include respective HE preambles 251-2 and data portions 266 that each spans a 10 MHz bandwidth. In an embodiment, OFDM data units 270-1, 270-2, 270-3 and 270-4 occupy the whole bandwidth but use different spatial streams (e.g., the OFDM data units are transmitted through MU MIMO).

Figure 3:
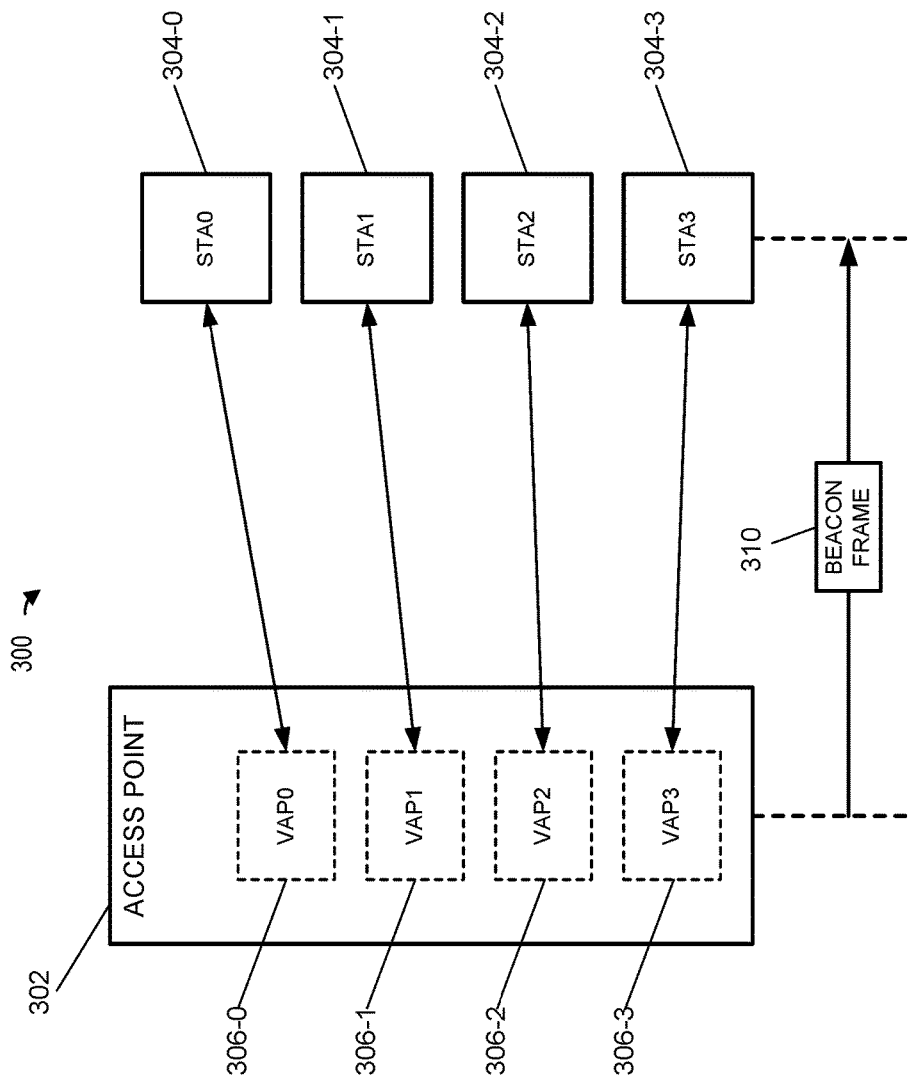
FIG. 3 is a diagram an example WLAN having an access point (AP) that supports multiple basic service sets (BSSs), according to an embodiment.

FIG. 3 is a diagram an example WLAN 300 having an access point (AP) device 302 that supports virtual APs and accordingly multiple BSSs for client stations 304, according to an embodiment. In an embodiment, the virtual APs supported (e.g., owned) by AP device 302 and client stations 304 generally correspond to the AP 14 and the client stations 25, respectively. In other embodiments, the AP device 302 and client stations 304 correspond to any other suitable communication devices. In various embodiments, the virtual APs owned by AP device 302 include the capability to advertise information for multiple virtual APs identified by basic service set identifiers (BSSIDs) of a multiple-BSSID set corresponding to the multiple BSSs using a single Beacon or Probe Response frame (e.g., beacon frame 310) instead of using multiple Beacon or Probe Response frames which do not include a multiple-BSSID element, each corresponding to a single BSSID, and the capability to indicate buffered frames for these multiple BSSIDs using a single traffic indication map (TIM) element in a single Beacon frame. In other words, as discussed above, one virtual AP owned by the AP device 302 generates beacon frames that include or identify different BSSIDs and AIDs for multiple BSSs of a multiple-BSSID set supported by the AP device 302. In an embodiment, a multiple-BSSID set is a set where: i) all members of the set use a common operating class, channel, Channel Access Functions, and antenna connector, ii) the set has a maximum range of $2^n$ for at least one n, where $1 \leq n \leq 48$, iii) members of the set have the same 48–n most significant bits (MSBs) in their BSSIDs, and iv) all BSSIDs within the multiple-BSSID set are assigned in a way that they are not available as MAC addresses for STAs using a different operating class, channel or antenna connector.

In the description provided herein, reference is made to "virtual access points", "virtual APs" or "VAPs" which represent the distinct BSSs (created by virtual APs) corresponding to the multiple BSSs that are supported by a same AP device. In various embodiments and/or scenarios, a client station can associate with one or more different VAPs. In an embodiment, a client station associates with one VAP (e.g., corresponding to a nontransmitted BSSID) and also monitors one or more different VAPs (e.g., corresponding to a transmitted BSSID).

In some embodiments, a first VAP (i.e., a VAP with a transmitted BSSID) transmits a broadcast data MPDU (frame), management MPDU, or control MPDU with the first VAP's BSSID as the transmitter address (TA) in a SU PPDU which is destined to client stations associated with multiple VAPs. In some embodiments, the client stations associated with any VAP use the transmitted BSSID to filter the broadcast frames. In some embodiments, a client station receives a control frame with the first VAP's BSSID as the transmitter address (TA) in SU PPDU which is destined to client stations associated with multiple VAPs, such as a trigger frame having per-user information fields (e.g., User Info fields in Trigger frame) for client stations associated with different VAPs, and responds with an uplink data unit that is a portion of an uplink MU data unit where the uplink data unit has a receiver address different from the transmitter address (TA) of the soliciting control frame. In some embodiments, a client station receives a control frame with the first VAP's BSSID as the transmitter address (TA) in a SU PPDU which is destined to client stations associated with multiple VAPs, such as a trigger frame having per-user information fields (e.g., User Info fields in Trigger frame) for client stations associated with different VAPs, and responds with an uplink data unit that is a portion of an uplink MU data unit where the uplink data unit has a receiver address same as the transmitter address (TA) of the soliciting control frame. In some embodiments, a second VAP (the VAP without/with transmitted BSSID) transmits a broadcast data MPDU (frame), management MPDU, or control MPDU with the second VAP's BSSID as the transmitter address (TA) in a SU PPDU which is destined to client stations associated with the second VAP. In some embodiments, the client stations associated with one VAP use the BSSID of its associated VAP to filter the broadcast frames. In some embodiments, a client station receives a control frame with the second VAP's BSSID as the transmitter address (TA) in SU PPDU which is destined to client stations associated with the second VAP, such as a trigger frame having per-user information fields (e.g., User Info fields in Trigger frame) for client stations associated with the second VAP, and responds with an uplink data unit that is a portion of an uplink MU data unit where the uplink data unit has a receiver address same as the transmitter address (TA) of the soliciting control frame.

In some embodiments, a downlink broadcast multi-user data unit includes broadcast data/management/control MPDUs addressed to client stations associated with single VAP and the broadcast MPDUs use the VAP's BSSID as the transmitter address (TA) in the MAC header. In such case, the downlink broadcast multi-user data unit (the related DL broadcast RU or/and the broadcast MPDUs in the DL broadcast RU) is identified by a specific AID which matches the VAP, in HE SIG. In some embodiment, the specific AID which matches the VAP follows the AID coding rules of TIM element for the multiple BSSs defined by multiple BSSID element.

In some embodiments, a downlink broadcast multi-user data unit includes broadcast data/management/control MPDUs addressed to client stations associated with different VAPs and the broadcast MPDUs use the transmitted BSSID as the transmitter address (TA) in the MAC header. In this case, the DL MU data unit (the related broadcast RU) is identified by a specific AID, e.g. 2047, in the HE-SIG field. In an embodiment, the client station (i.e., a receiver) receives a DL MU data unit with a control frame (e.g., a trigger frame having per-user information fields, identified by a specific AID, e.g., 2047 in the HE-SIG field) from a first VAP (e.g., a transmitter address corresponds to the first VAP) and responds with an uplink data unit that is a portions of an uplink MU data unit where the uplink data unit has a receiver address different from a transmitter address of the downlink multi-user data unit, e.g. the associated VAP's BSSID is used instead of transmitted BSSID. In another embodiment, each responding uplink MPDU has a receiver address which is the same as the transmitter address of the downlink multi-user data unit.

In the embodiment shown in FIG. 3, the AP device 302 supports multiple VAPs 306, referred to herein as VAP0, VAP1, VAP2, and VAP3, which include BSS 306-0, BSS 306-1, BSS 306-2, and BSS 306-3 respectively (BSSS 306-0/1/2/3 can be referred to as VAP 0/1/2/3 respectively). In some embodiments, the AP device 302 is a single, physical AP that supports the virtual access points. In other embodiments, a group of APs or other suitable communication devices are communicatively coupled (e.g., via a wired LAN) to support the virtual access points. The AP device 302 supports the multiple BSSs using at least some features of the multiple BSSID element, as described in the IEEE 802.11REVmc draft standard; however, as discussed above, the AP device 302 utilizes a fixed mapping of AIDs, as described herein.

Figure 4:
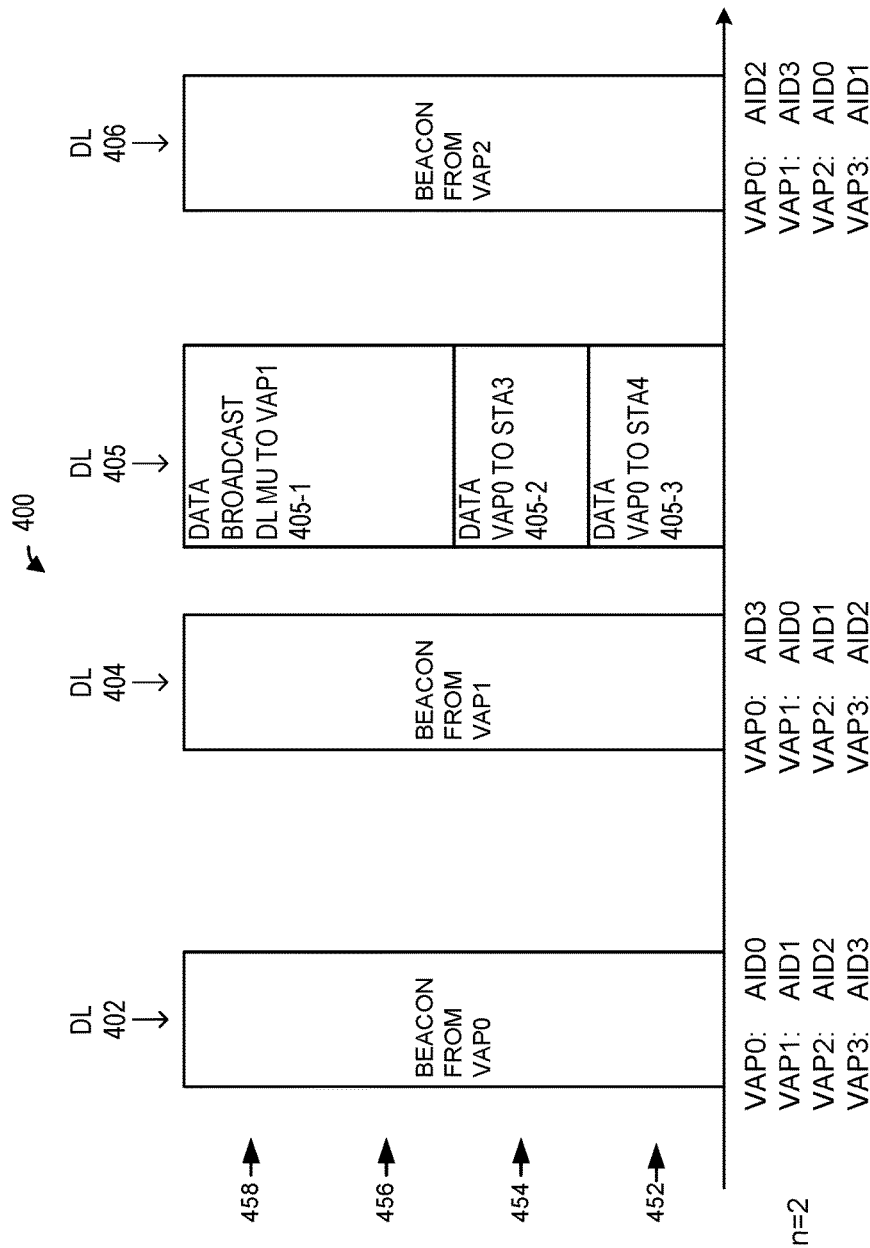
FIG. 4 is a diagram of example beacon frames transmitted by the AP of FIG. 3 for different BSSs, according to an embodiment.

FIG. 4 is a diagram of example beacon frames 402, 404, and 406 transmitted by an AP that supports multiple BSSs VAP0, VAP1, VAP2, and VAP3 of a multiple-BSSID set, according to an embodiment. Generally, the IEEE 802.11REVmc draft standard describes a Multiple BSSID element whose MaxBSSIDIndicator field has a value n which defines at most $2^n$ VAPs and these VAPs correspond to AID0 to AID $2^n-1$, respectively. In the embodiment shown in FIG. 4, the beacon frame 402, 404, and 406 include respective multiple BSSID elements (not shown) and optional respective TIM elements (not shown). In some embodiments, the AID coding rules of TIM elements for the multiple BSSs are used to define one AID of a VAP for identifying the broadcast DL MU data unit (DL broadcast RU) which are addressed to client stations associated with the VAP in DL MU transmission. In an embodiment, the TIM elements generally correspond to the TIM element defined in the IEEE 802.11REVmc draft standard and include a bitmap control field (where bit 0 of the bitmap control field contains a traffic indication virtual bitmap bit associated with AID0, the transmitted BSSID) and a partial virtual bitmap field (assume VAP[i] has AID0 where i is >=0 and <=3, then bitmap 1 to 3 are associated with AID1 to AID 3, the respective nontransmitted BSSID are VAP[(i+1) mod 4], VAP[(i+2) mod 4], VAP[(i+2) mod 4]). As shown in FIG. 4, one VAP has different AID values when different VAPs transmit Beacon frames with the multiple BSSID element.

In an embodiment, the HE-SIGB field 209 in DL MU transmission 405 includes all or a portion of AID 0 to 3 (i.e., STA-ID subfield). In an embodiment, for example, the 11 least significant bits (LSBs) of the AID are used to address intended recipients where, for resource units (RUs) that carry a broadcast allocation: i) For a single BSS AP, the ST-AID for broadcast will be 0, ii) For Multiple BSS AP, the ST-AID for broadcast to a specific BSS will follow the group addressed AID assignment in the TIM element according to Multi-BSSID traffic indication map (TIM) operation, iii) For multiple BSS AP, the ST-AID for broadcast to all BSS of the AP is set to 2047, iv) STAID value 2046 is used to indicate that the RU carries no data, and v) When a STA transmits on the uplink using the HE MU PPDU format, the STA-ID field is populated by the AID of the transmitter assigned by the AP. In some scenarios, after receiving a Beacon frame with the multiple BSSID element, a client station determines the group addressed AID assignment for its associated VAP per the content of the multiple BSSID element and the TIM element definition. Assume the MaxBSSIDIndicator field of the Multiple BSSID element has value n. In some embodiments, if the associated VAP is the transmitted BSSID of the multiple BSSID set, the transmitted BSSID is assigned AID0, and if the n LSB BSSID of the associated VAP is (n LSB of the transmitted BSSID+i) mod $2^n$, BSSID is assigned AID i. In these embodiments, the assignment of AIDs to various BSSIDs utilizes the BSSID corresponding to the transmitted BSSID as a reference for determining the AIDs of the nontransmitted BSSIDs, and thus the assignment is not fixed if multiple VAPs transmit Beacon frames with the multiple BSSID element, but instead is dependent upon which BSSID has transmitted the beacon frame.

In some scenarios, the AP device 302 transmits beacon frames having different transmitted BSSIDs, for example, in order to support legacy client stations that cannot properly interpret or decode a multiple BSSID element. The beacon frame 402 whose MaxBSSIDIndicator in the Multiple BSSID element has a value 2 is transmitted by the BSS VAP0 (i.e., the transmitted BSSID is VAP0) whose 2 LSB of BSSID are 00, and thus the corresponding AID values for VAPs are: i) the AID0 to the BSS VAP0, ii) the AID1 to the BSS VAP1 whose 2 LSB of BSSID are 01, iii) the AID2 to the BSS VAP2 whose 2 LSB of BSSID are 10, and iv) the AID3 to the BSS VAP3 whose 2 LSB of BSSID are 11. The beacon frame 404 is transmitted by the BSS VAP1 (i.e., the transmitted BSSID is VAP1), and thus the corresponding AID values for VAPs are: i) the AID0 to the BSS VAP1, ii) the AID1 to the BSS VAP2, iii) the AID2 to the BSS VAP3, and iv) the AID3 to the BSS VAP0. The beacon frame 406 is transmitted by the BSS VAP2 (i.e., the transmitted BSSID is VAP2), and thus the corresponding TIM element (not shown) maps: i) the AID0 to the BSS VAP2, ii) the AID1 to the BSS VAP3, iii) the AID2 to the BSS VAP0, and iv) the AID3 to the BSS VAP1.

In the embodiment shown in FIG. 4, the AP generates and transmits a downlink multi-user OFDMA data unit 405, after the beacon frame 404, to i) client stations associated with the VAP1, ii) client station STA3, and iii) client station STA4. In an embodiment, for example, the AP generates the OFDM data unit 405-1 to be processed by client stations associated with the VAP1 by setting the STA-ID subfield of the HE-SIGB field 209 to the AID associated with the VAP1. In this embodiment, the most recent mapping of AIDs to BSSs is provided by beacon frame 404, and thus the AP sets the STA-ID subfield of the OFDM data unit 405-1 to AID0. In another embodiment, the AP generates a second downlink multi-user OFDMA data unit (not shown) to client stations associated with the VAP1, but after the beacon frame 406. In this embodiment, the most recent mapping of AIDs to BSSs is provided by the beacon frame 406, and thus the AP sets the STA-ID subfield of the second OFDM data unit to AID3. In one scenario, a receiver or client station that misses the beacon frame 406 or has an inaccurate TSF time would monitor for downlink multi-user OFDM data units addressed to AID0, not AID3, and thus may miss the downlink multi-user OFDM data units. In some embodiments, this scenario is avoided by utilizing a fixed mapping of AIDs to BSSs, as described below.

In some embodiments and/or scenarios, a client station transmits an uplink OFDM data unit, for example, in response to a downlink trigger frame, soliciting frame, or other suitable frame. When the trigger frame is destined to client stations associated with different VAPs and solicits data/management frames, the transmitter address (TA) is transmitted BSSID. The solicited data/management frames in uplink MU PPDU are destined to different VAPs. For encryption and decryption operation, the data/management frames in uplink MU PPDU need to use the destination VAP's BSSID instead of transmitted BSSID. In an embodiment, the client station sets a receiver address (RA) of the uplink data/management frames to a value different from the transmitter address of the downlink broadcast soliciting control frame, for example, when the uplink OFDM data unit is a portion of an uplink multi-user transmission (e.g., a MU OFDMA and/or MU-MIMO transmission). When the trigger frame is destined to client stations associated with different VAPs and solicits control frames, the transmitter address (TA) is the transmitted BSSID. The solicited control frames in uplink MU PPDU are destined to different VAPs. The control frame has no encryption/decryption requirement. In this embodiment, the TA of the soliciting control frame is utilized as the RA of the solicited control frames in UL MU transmission. In another embodiment, the client station uses its associated AP's BSSID as the RA of the solicited control frames in UL MU transmission. In an embodiment, the client station sets a receiver address (RA) of the uplink control frame to a value different from the transmitter address of the downlink soliciting control frame, e.g. the client station's BSSID as the RA, for example, when the uplink OFDM data unit is a portion of an uplink multi-user transmission (e.g., a MU OFDMA and/or MU-MIMO transmission). In an embodiment, the client station sets a receiver address (RA) of the uplink control frame to a value same as the transmitter address of the downlink soliciting control frame, when the uplink OFDM data unit is a portion of an uplink multi-user transmission (e.g., a MU OFDMA and/or MU-MIMO transmission).

Figure 5:
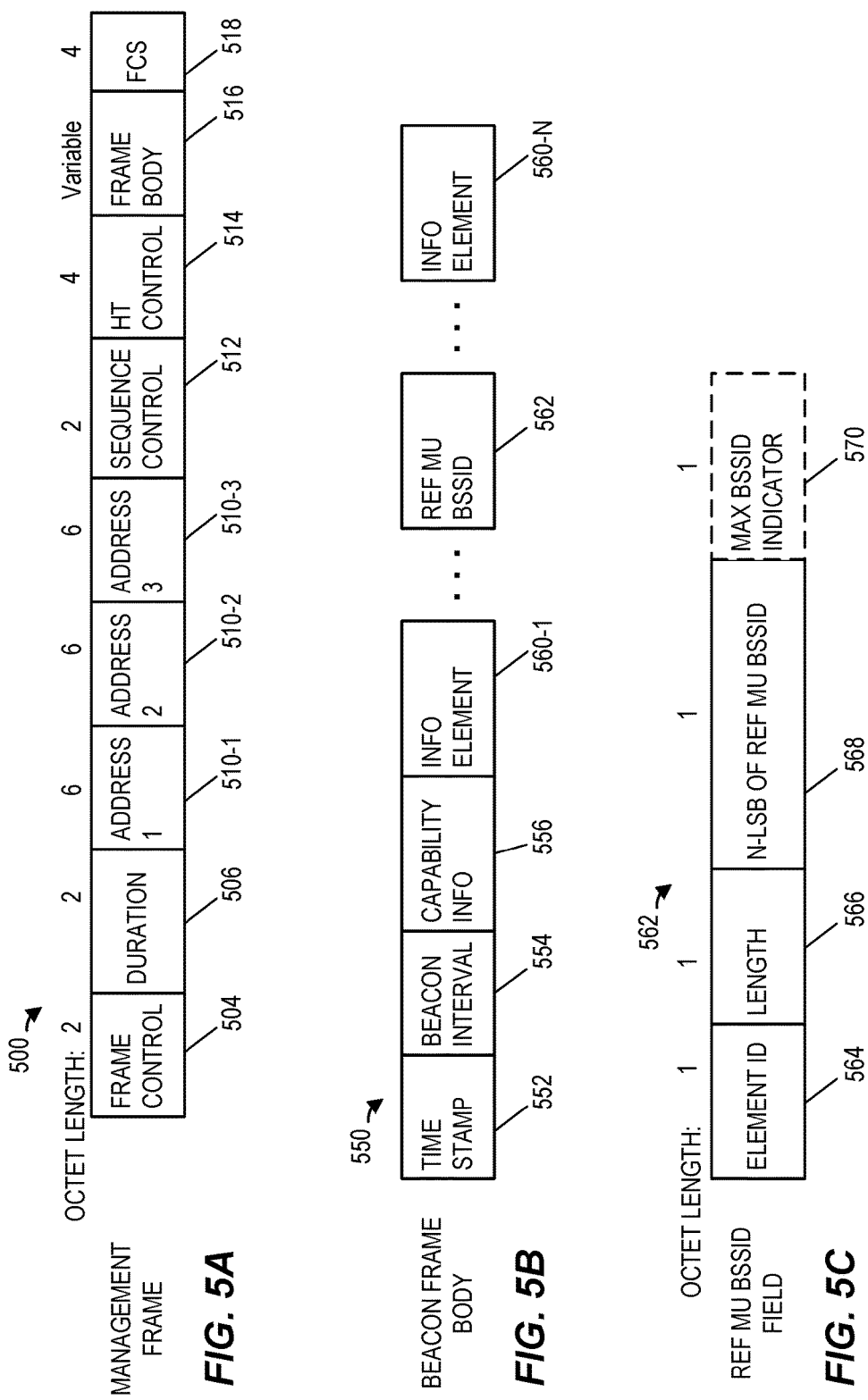
FIG. 5A is a diagram of an example management frame, according to an embodiment.
FIG. 5B is a diagram of an example frame body for a beacon frame having a reference (REF) MU basic service set identifier (BSSID) field, according to an embodiment.
FIG. 5C is a diagram of an example REF MU BSSID element, according to an embodiment.

FIG. 5A is a diagram of an example MPDU 500 for a data frame, management frame, or control frame (data/management/control frame 500), according to an embodiment where some fields may not be needed by a control frame. The data/management/control frame 500 corresponds to a QoS Data frame, Trigger frame, beacon frame, probe response frame, association response frame, Action frame, or other suitable frame, in various embodiments and/or scenarios. In various embodiments and/or scenarios, the data/management/control frame 500 is included in a downlink (DL) data unit transmitted by the AP 14 to a client station 25 or a DL multi-user (MU) data unit transmitted by the AP 14 to multiple client stations 25. In some embodiments and/or scenarios, the data/management/control frame 500 is included in an uplink (UL) data unit transmitted by a single client station 25 to the AP 14. In some embodiments and/or scenarios, the data/management/control frame 500 is included in an uplink data unit transmitted by a single client station 25 to the AP 14. In some embodiments and/or scenarios, the data/management/control frame 500 is included in a plurality of data units of an UL MU data unit, for example, transmitted over respective OFDM sub-channels of an OFDMA transmission and/or streams of a MU-MIMO transmission by multiple client stations.

The data/management/control frame 500 generally corresponds to a MAC frame format for a management frame as defined in the IEEE 802.11REVmc draft standard, in various embodiments. The data/management/control frame 500 includes a frame control field 504 (2 octets), a duration/ID field 506 (2 octets), a first address field 510-1 (6 octets), a second address field 510-2 (6 octets), a third address field 510-3 (6 octets), a sequence control field 512 (2 octets), a high throughput (HT) control field 514 (4 octets), a frame body 516 (variable number of octets), and a frame check sequence (FCS) field 518 (4 octets), in the illustrated embodiment. The number above each field in FIG. 5A indicates the number of octets occupied by the corresponding field, according to an example embodiment. Each of the address fields 510 is a 48 bit (6 octets) field that includes a MAC address of a device associated with the data unit 300, such as a transmitting device (transmitter) of the data unit 500, a receiving device (receiver) of the data unit 500, a BSSID associated with the data unit 500, etc.

FIG. 5B is a diagram of an example frame body 550 for a beacon frame having a reference (REF) MU basic service set identifier (BSSID) field, according to an embodiment. In some embodiments, the reference MU BSSID indicates the VAP whose AID is 0. The VAP with AID i value has n LSB of BSSID (n LSB of reference MU BSSID+i) mod $2^n$. With the added reference MU BSSID element, each VAP has a fixed AID value. In some embodiments and/or scenarios, the frame body 550 is the frame body 516 of a beacon frame generated by different VAPs of the AP device 14. In other embodiments and/or scenarios, the frame body 550 is the frame body 516 of a probe response frame, an association response frame, or other suitable frame. In the embodiment shown in FIG. 5B, the frame body 550 generally corresponds to a beacon frame format as defined in the IEEE 802.11REVmc draft standard, and includes suitable information elements and the reference BSSID element. In the embodiment shown in FIG. 5B, the frame body 550 includes a time stamp field 552, a beacon interval field 554, a capability information field 556, and N information elements 560. The beacon interval 554 is omitted in an embodiment, for example, when the frame body 550 corresponds to an association response frame.

The information elements 560 include a reference multi-user (MU) BSSID (REF MU BSSID) element 562, in various embodiments. In an embodiment, the REF MU BSSID element 562 is a standalone information element of the beacon frame, for example, when the beacon frame does not include a multiple BSSID element. In other embodiments, the REF MU BSSID element 562 is an information element of a beacon frame that includes the Multiple BSSID element (described below). Assume the value in MaxBSS-Indicator field which is defined by Multiple BSSID element is n, the REF MU BSSID element 562 also includes n-LSB REF MU BSSID (a reference identifier) that identifies the BSSID whose AID is 0. In an embodiment, all VAPs of the same AP device have same 48−n MSB BSSID. The REF MU BSSID element 562 indicates a fixed mapping of AIDs to BSSIDs in a multiple BSSID set supported by the AP 14, in various embodiments. In some embodiments, the REF MU BSSID element 562 includes an indication of a maximum size of the corresponding multiple BSSID set.

FIG. 5C is a diagram of an example REF MU BSSID element 562 where the REF MU BSSID element is separate from the Multiple BSSID element, according to an embodiment. The REF MU BSSID element 562 includes an element ID field 564 (1 octet), a length field 566 (1 octet), a reference identifier 568 (1 octet), and optionally, a maximum BSSID indicator 570 (1 octet), in various embodiments. The reference indicator 568 can be more than 1 octet if the value in maximum BSSID indicator 570 is greater than 8, in some embodiments. In an embodiment, the management frame 500 is a beacon frame that includes the Multiple BSSID element as defined in the IEEE 802.11REVmc draft standard, which includes a maximum BSSID indicator (MaxBSSID Indicator), and thus the maximum BSSID indicator 570 is omitted from the REF MU BSSID element 562.

The reference identifier 568 includes an indication of an integer number n of LSBs of a reference multi-user BSSID (reference MU BSSID) where n is the value in maximum BSSID indicator 570 or MaxBSSID Indicator field in Multiple BSSID element, in an embodiment. The AP 14 provides the reference identifier 568 so that a receiver of the REF MU BSSID element 562 can derive the fixed mapping of AIDs to BSSIDs. In an embodiment, all VAPs of the same AP device have a same 48−n MSB BSSID. In an embodiment, the n LSBs of the reference multi-user BSSID define a reference BSSID corresponding to a particular AID (e.g., AID0) for broadcast DL resource units (RUs). In various embodiments, the broadcast DL RUs are identified by the HE-SIGB field 209 and are utilized for a trigger frame, a multi-user block acknowledgment frame, a null data packet announcement frame, or other suitable frame that is sent to a group of communication devices and includes an AID that indicates which communication devices should process the frame. In this embodiment, the reference BSSID provides a fixed mapping of AIDs to BSSIDs in the multiple BSSID set, regardless of which VAP of the multiple BSSID set transmits the management frame 500.

The maximum BSSID indication 570 contains a value assigned to n, where $2^n$ is the maximum number of BSSIDs in the multiple BSSID set or the maximum number of VAPs of an AP device defined by multiple BSSID set, in an embodiment. In the embodiment shown in FIG. 4, n is equal to 2, and thus four BSSIDs ($2^2$ BSSIDs, corresponding to VAP0, VAP1, VAP2, and VAP3) are included in the multiple BSSID set. Among four VAPs, two LSBs of their BSSIDs are different, and 46 MSBs of their BSSIDs are the same. In some scenarios, only a portion of the BSSIDs in the multiple BSSID set are supported by the AP 14 (e.g., only VAP0 and VAP1). In various embodiments, the AIDs corresponding to the BSSIDs of the multiple BSSID set can be derived by a receiver of the management frame 500 based on i) the maximum BSSID indicator 570, ii) the reference identifier 562, and iii) a transmitter address 510-1 of the management frame 500.

In various embodiments, the AID mapped to a VAP is AID0 if the BSSID of the VAP (i.e., the transmitter address of a beacon for the VAP) is the same as a reference MU BSSID. In an embodiment, the reference MU BSSID is a member of the multiple-BSSID set, and thus the reference MU BSSID shares the same (48−n) MSBs with other members of the multiple-BSSID set, and the remaining n LSBs of the reference MU BSSID are provided in the reference identifier 568. In an embodiment, the receiver (e.g., client station 25) determines the reference MU BSSID by determining a value of BSSID_A OP_OR BSSID_B, where OP_OR is a Boolean OR operation, BSSID_A is a BSSID with (48−n) MSBs equal to the (48−n) MSBs of the reference MU BSSID (obtained from the shared bits of the transmitter address of the management frame 500) concatenated with n LSBs equal to zero, and BSSID_B is a BSSID with (48−n) MSBs equal to zero concatenated with the n LSBs of the reference identifier 568.

For BSSIDs other than the reference MU BSSID, the receiver derives the AID of the VAP as AIDi when the BSSID of the VAP is equal to BSSID_A OP_OR BSSID_B, where OP_OR is a Boolean OR operation, BSSID_A is a BSSID with (48−n) MSBs equal to the (48−n) MSBs of the reference MU BSSID (obtained from the shared bits of the transmitter address of the management frame 500) concatenated with n LSBs equal to zero, and BSSID_B is a BSSID with (48−n) MSBs equal to zero concatenated with the n LSBs of a sum of i and the n LSBs of the reference identifier 568, in an embodiment. In this embodiment, the concatenation with the n LSBs of the sum of i and the n LSBs of the reference identifier 568 provides a circular numbering system for AID values.

In an embodiment, for example, the AP 14 supports the VAP0, VAP1, and VAP2, corresponding to BSSIDs of 16, 17, and 27 (0x000000000010, 0x000000000011, and 0x00000000001B), which share the operating class, channel and antenna connector, and the range of MAC addresses from 16-31 inclusive are not assigned to other STAs using a different antenna connector, and thus the BSSIDs 16, 17, and 27 are members of a multiple-BSSID set. In this embodiment, the multiple-BSSID set is described by n=4 ($2^n$=16) with BSSIDs in the range 0x00000000001X. In this embodiment, for example, the BSSID 27 (0x00000000001B) is the reference MU BSSID and thus corresponds to AID0, the maximum BSSID indication has a value of n=4, the reference identifier 568 has a value of 00001011 (0xB), and the (48−n) MSBs of the reference MU BSSID have a value of 1 (0x00000000001). In one scenario, the management frame 500 has a transmitter address of 0x00000000001B, and thus the BSSID_A is 0x000000000010, and the value of i which results in a sum having the 4 LSBs equal to 0000 (matching the 4 LSBs of BSSID 16) is 5. In other words, 0x0B plus 0x05 is 0x10, the 4 LSBs of which are 0x0, which is appended to the (48−n) bits of 0x00000000001, resulting in the BSSID 16 (0x000000000010) being mapped to AID5. In a similar manner, the BSSID 17 is mapped to AID6 in this embodiment.

Figure 6:
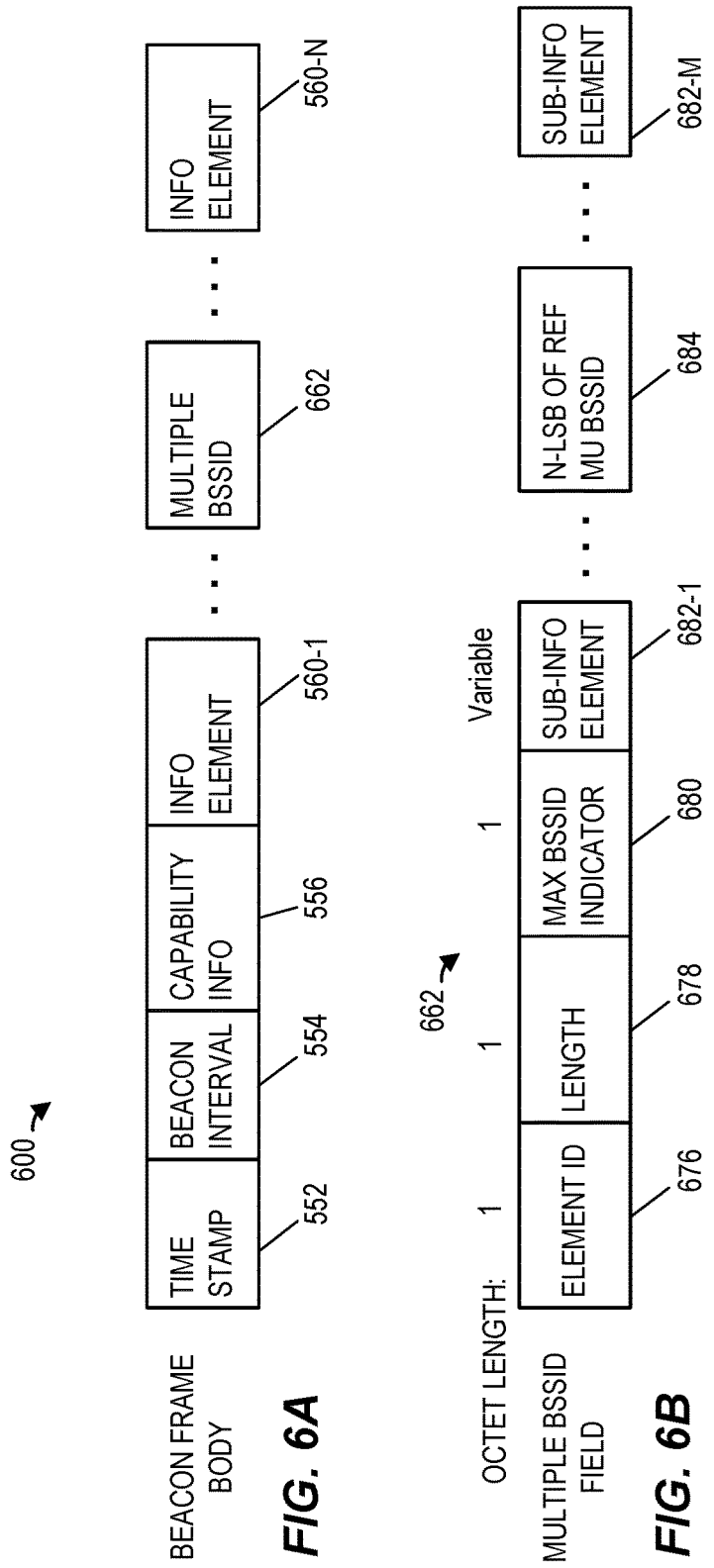
FIG. 6A is a diagram of an example frame body for a beacon frame having a multiple BSSID field, according to an embodiment.
FIG. 6B is a diagram of an example multiple BSSID field, according to an embodiment.

FIG. 6A is a diagram of an example frame body 600 for a beacon frame having a multiple BSSID field 662, according to an embodiment. The frame body 600 generally corresponds to the frame body 500, but includes the contents of the REF MU BSSID field 562 in a sub-element of the multiple BSSID element 662, in an embodiment. In other embodiments, REF MU BSSID is a standalone element. In one embodiment, if a VAP's BSSID is not transmitted BSSID (VAP's AID is not 0), the VAP can include REF MU BSSID in its transmitted Beacon frames and doesn't include Multiple BSSID element in its transmitted Beacon frames.

FIG. 6B is a diagram of an example multiple BSSID element 662, according to an embodiment. The multiple BSSID element 662 includes an element ID field 676 (1 octet), a length field 678 (1 octet), a maximum BSSID indicator 680 (1 octet), and M sub-elements 682, in various embodiments. The maximum BSSID indicator 680 generally corresponds to the maximum BSSID indicator 570, in an embodiment, and thus, when the maximum BSSID indicator 680 is present in the multiple BSSID field 662, the maximum BSSID indicator 570 can be omitted. The sub-elements 682 include a reference MU BSSID sub-element 684, which generally corresponds to the MU BSSID element 562, in an embodiment.

Figure 7:
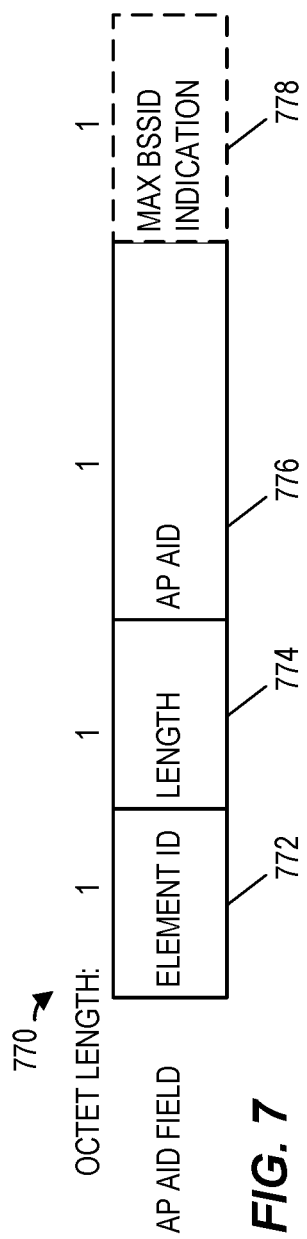
FIG. 7 is a diagram of an example AP association ID (AP AID) field for a beacon frame, according to an embodiment.

FIG. 7 is a diagram of an example AP association ID (AP AID) element 770 for a management frame, according to an embodiment. In some embodiments and/or scenarios, the AP 14 includes the AP AID element 770 in place of the REF MU BSSID element 562. In various embodiments, for example, the AP AID element 770 is a standalone element of the frame body 550 or a sub-element of the Multiple BSSID element 662. The AP AID element 770 includes an element ID field 772 (1 octet), a length field 774 (1 octet), a reference identifier 776 (1 octet), and optionally, a maximum BSSID indicator 778 (1 octet). The element ID field 772, the length field 774, and the maximum BSSID indicator 778 generally correspond to the element ID field 564, the length field 566, and the maximum BSSID indicator 570, in an embodiment.

The AP AID 776 is a reference identifier that indicates the AID of the VAP that transmits the corresponding frame (e.g., a management frame 500 that includes the AP AID element 770 in place of the REF MU BSSID element 562). The AP 14 provides the AP AID 776 so that a receiver can derive the reference BSSID using the transmitter address (BSSID) and AID value of in received AP AID element 770, in a manner similar to the reference MU BSSID described above, in an embodiment. In an embodiment, the reference MU BSSID is the transmitter address of the corresponding frame when the AP AID 776 is equal to AID0. For AP AID 776 is AIDi where AIDi is not equal to AID0, the receiver derives the reference MU BSSID as BSSID_A OP_OR BSSID_B, where OP_OR is a Boolean OR operation, BSSID_A is a BSSID with (48−n) MSBs equal to the (48−n) MSBs of the reference MU BSSID (obtained from the shared bits of the transmitter address of the management frame 500) concatenated with n LSBs equal to zero, and BSSID_B is a BSSID with (48−n) MSBs equal to zero concatenated with n LSBs equal to ($2^n$+n LSBs of the transmitter address-i) mod $2^n$, in an embodiment.

In an embodiment, with the definition of the reference BSSID, the AP device 14 generates a data/management/control frame which is destined to client stations associated with multiple VAPs with the transmitter address of the data/management/control frame set to the reference BSSID.

FIG. 8 is a diagram of an example multiple BSSID Indication element 870 for a management frame, according to an embodiment. In some embodiments and/or scenarios, the AP device 14 includes the multiple BSSID Indication element 870 in place of the Multiple BSSID element 662. In an embodiment, the VAPs of AP device 14 whose BSSIDs are not transmitted BSSID (REF MU BSSID) include the multiple BSSID Indication element 870 in their transmitted beacon frames (Multiple BSSID element 662 are not in such Beacons). The VAP whose BSSID is transmitted BSSID (REF MU BSSID) includes Multiple BSSID element 662 as defined in IEEE 802.11REVmc draft standard in its beacon frames. In an embodiment, only one VAP transmits Beacon frames (and other management frames) which include the Multiple BSSID element and the other VAPs transmit Beacon frames (and other management frames) which include the multiple BSSID Indication element 870. The multiple BSSID indication element 870 includes an element ID field 872 (1 octet), a length field 874 (1 octet), an element ID extension 876, and a transmitted BSSID information element 878 (2 octets), in an embodiment. The element ID field 872 and the length field 874 generally correspond to the element ID field 564 and the length field 566, in an embodiment. The element ID extension field 876 indicates that the transmitted BSSID information element 878 is included in the multiple BSSID Indication element 870.

The transmitted BSSID info field 878 includes a maximum BSSID indicator 882 (4 bits) and a reference identifier 884 (12 bits), in an embodiment. Other lengths of maximum BSSID indicator 882 and reference identifier 884 are also possible in other embodiments, e.g. a maximum BSSID indicator 882 (8 bits) and a reference identifier 884 (8 bits). In an embodiment, the value n in maximum BSSID indicator field 882 is always less than the field length of reference identifier 884 in bits. The maximum BSSID indicator 882 indicates a bitmap length of LSBs which are unique to the transmitted BSSID (e.g., the VAP's BSSID whose AID is 0 or the VAP whose beacon frames include Multiple BSSID element), in an embodiment. In a manner similar to the reference MU BSSID described above, a value n of the maximum BSSID indicator 882 indicates that the (48−n) MSBs of the transmitted BSSID are shared with other members of VAPs defined by the multiple BSSID set, in an embodiment. Then LSBs of reference identifier 884 include the n LSBs of the BSSID which are unique to the transmitted BSSID, in an embodiment. The reference identifier 884 is 12 bits in length in the illustrated embodiment, but additional or fewer bits are utilized for a different suitable bit length in other embodiments.

A client station that receives a Beacon with multiple BSSID Indication element 870 can determine the transmitted BSSID (REF MU BSSID) by using BSSID_A OP_OR BSSID_B, where OP_OR is a Boolean OR operation, BSSID_A is a BSSID with (48−n) MSBs equal to the (48−n) MSBs of the BSSID address (obtained from address 510-3 of the management frame 500) concatenated with n LSBs equal to zero, and BSSID_B is a BSSID with (48−n) MSBs equal to zero concatenated with the n LSBs of the reference identifier 884. The value n is the value in max BSSID indicator 882. Once the client station acquires the transmitted BSSID (REF MU BSSID), it can determine the beacon which carries the Multiple BSSID element (e.g. the beacon whose transmitter address is the transmitted BSSID). Through the received Multiple BSSID element, the client station can get BSS management parameters of all VAPs. In one embodiment, once the Beacon with the Multiple BSSID element is received, a client station determines whether to associate with the VAP with the transmitted BSSID (e.g., the REF MU BSSID) or other VAPs defined by the Multiple BSSID element.

The transmitted multiple BSSID Indication element 870 of a management frame 500 indicates to a client station 25 receiving the frame that the AP which transmitted the management frame 500 is a virtual AP, in an embodiment. In an embodiment, the client station 25 determines the AIDi of its associated AP according to n LSBs of the associated AP=(n LSBs of the Transmitted BSSID+i) mod $2^n$.

Figure 9A:
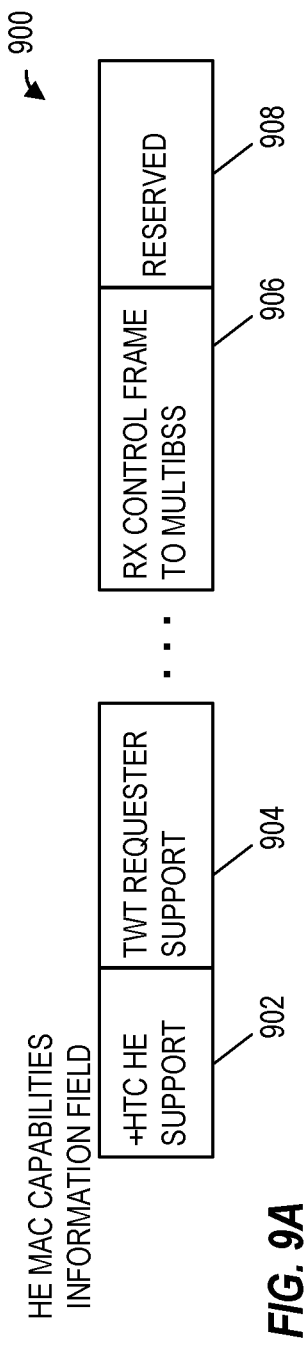
FIG. 9A is a diagram of an example high efficiency (HE) MAC Capabilities Information field, according to an embodiment.

FIG. 9A is a diagram of an example high efficiency (HE) MAC capabilities information field 900 for a management frame, according to an embodiment. The HE MAC capabilities information field 900 generally corresponds to the HE MAC capabilities information field as announced by HE capable APs or client stations and includes a +HTC support field 902, a TWT requestor support field 904, a reserved field 908, and other suitable fields, in various embodiments. In the embodiment shown in FIG. 9A, the HE MAC capabilities information field 900 includes an RX control frame field 906. The RX control frame field 906 indicates whether the client station, when associated with a BSS corresponding to a nontransmitted BSSID, supports reception of control frames with a transmitter address equal to a transmitted BSSID, in an embodiment. The client station 25 transmits a management frame that includes the RX control frame field 906 to indicate support for reception of control frames from the transmitted BSSID, in an embodiment. In other words, the client station 25 monitors for broadcast control frames and/or broadcast management frames having a transmitter address (TA, i.e., address 2 of the MAC header) corresponding to either of the associated nontransmitted BSSID or the transmitted BSSID. In an embodiment, the RX control frame field 906 has a single bit that the client station 25 sets to 1 to indicate support for control frames from the transmitted BSSID, or 0 to indicate a lack of support for the control frames. A client station 25 that is associated with a non-transmitted BSSID and has indicated support for receiving control frames with a transmitter address set to the transmitted BSSID (i.e., RX Control Frame field 906 set to 1), responds with a control frame whose receiver address is set either to the nontransmitted BSSID or the transmitted BSSID (i.e., the transmitter address of a soliciting MU block ack request frame).

Where an AP device 14 (i.e. VAPs of the AP device) does not receive the HE Capabilities information field 900 with the RX Control Frame field 906 being set to 1 from a client station, the AP device 14 does not send trigger frames whose destination stations associate with more than one VAP to the client station, in an embodiment. Where an AP 14 does not receive the HE Capabilities information field 900 with the RX Control Frame field 906 being set to 1 from a client station, the AP device 14 does not send a Multi-STA Block Ack frame whose destination client stations associate with more than one AP to the client station. Where an AP 14 does not receive the HE Capabilities information field 900 with the RX Control Frame field 906 being set to 1 from a client station, the AP 14 does not send a null data packet (NDP) Announcement frame whose destination client stations associate with more than one AP to the client station.

Figure 9B:
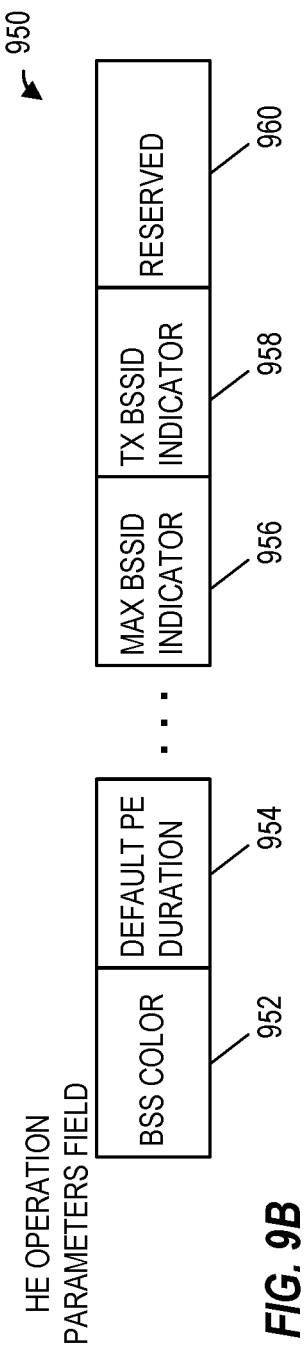
FIG. 9B is a diagram of an example HE Operation element of a beacon frame, according to an embodiment.

FIG. 9B is a diagram of an example HE operation element 950 of a beacon frame, (Re-)Association Response frame, or Probe Response frame, according to an embodiment. The HE operation element 950 generally corresponds to the HE operation element which defines HE BSS operation parameters and includes a BSS color field 952, a default PE duration field 954, a reserved field 960, and other suitable fields, in various embodiments. In the embodiment shown in FIG. 9B, the HE operation element 950 includes a maximum BSSID indicator 956 (3 bits) and a transmitted BSSID indicator 958 (1 bit). The maximum BSSID indicator 956 and transmitted BSSID indicator 958 have other suitable lengths, in other embodiments.

The transmitted BSSID indicator 958 indicates whether the AP 14 that transmits the frame that contains the beacon frame or probe response frame is the transmitted BSSID (REF MU BSSID), in an embodiment. A VAP owned by the AP device 14 corresponds to a nontransmitted BSSID if the VAP transmits management frames with the transmitted BSSID indicator 958 being set to 0. A VAP owned by the AP device 14 corresponds to the transmitted BSSID if the VAP transmits management frames with the transmitted BSSID indicator 958 being set to 1. In an embodiment, only one VAP owned by an AP device 14 transmits management frames with transmitted BSSID indicator being set to 1, and all other VAPs owned by the AP device 14 transmit management frames with the transmitted BSSID indicator 958 being set to 0. In one embodiment, the management frame with transmitted BSSID indicator being set to 1 include Multiple BSSID element, and the management frame with transmitted BSSID indicator being set to 0 doesn't include Multiple BSSID element. The maximum BSSID indicator 956 generally corresponds to the maximum BSSID indicator 570, and thus contains a value assigned to n, where $2^n$ is the maximum number of BSSIDs in the multiple BSSID set, in an embodiment.

A VAP corresponding to a nontransmitted BSSID sets the transmitted BSSID indicator 958 to 0, while the VAP corresponding to a transmitted BSSID sets the transmitted BSSID indicator 958 to 1, in an embodiment. The VAP corresponding to a nontransmitted BSSID or a transmitted BSSID sets the maximum BSSID indicator 956 to non-zero value. An AP corresponding to neither a nontransmitted BSSID nor a transmitted BSSID sets both the maximum BSSID indicator 956 and transmitted BSSID indicator 958 to 0.

In various embodiments and/or scenarios, an AP corresponding to a transmitted BSSID transmits beacon frames, (Re-)Association response frames, and probe response frames that include a multiple BSSID element. Where the AP device 14 supports multiple BSSIDs, the AP device 14 utilizes only a single BSSID as the transmitted BSSID for beacon frames and probe response frames, in an embodiment. A client station that associates with a VAP whose maximum BSSID indicator 956 is set to n and whose transmitted BSSID indicator 958 is set to 0 monitors for and decodes a beacon frame with Multiple BSSID element whose 48−n MSBs of the BSSID are the same as the 48−n MSBs of the BSSID of the AP with which the client station is associated, in an embodiment. In an embodiment, based on a Multiple BSSID element in a decoded beacon from the transmitted BSSID, the client station decides whether to associate with other APs. In an embodiment, based on the decoded beacons from the transmitted BSSID, the client station determines the AIDi of its associated AP according to n LSBs of the associated AP=(n LSBs of the Transmitted BSSID+i) mod $2^n$. In an embodiment, after a client station receives a management frame with maximum BSSID indicator 956 being non zero and transmitted BSSID indicator 958 being 0, the client station monitors for and decodes a subsequent beacon frame with Multiple BSSID element whose 48−n MSBs of the BSSID are the same as the 48−n MSBs of the BSSID of the received management frame. Based on the Multiple BSSID element, the client station determines the BSS operation parameters of all VAPs defined by the Multiple BSSID element and selects one VAP to associate with.

In some embodiments, the receiver address field of a BlockAck frame that is not a Multi-STA BlockAck variant is the transmitter address of a soliciting frame or the address of the recipient client station whose data/management frames are being acknowledged. In an embodiment, an AP device 14 that transmits a Multi-STA BlockAck frame with different values of the AID subfield in Per STA Info subfields sets the receiver address field to the broadcast address. In an embodiment, an AP device 14 that transmits a compressed BA or a Multi-STA BlockAck frame with a single AID subfield or with the same values of the AID subfield in Per STA Info subfields sets the receiver address field to the address of the recipient STA that requested the Block Ack or to the broadcast address. In an embodiment, a client station 25 transmits a compressed BA or a Multi-STA BlockAck frame with a single AID subfield or with the same values of the AID subfield in Per STA Info subfields and sets the receiver address field to the transmitter address of the soliciting frame or the address of the recipient client station whose data/management frames are being acknowledged. In an embodiment, the receiver address field of the data frames and management frames sent in response to a trigger frame are set to the MAC address of the destination AP. In various embodiments, the MPDUs within an A-MPDU are addressed to the same receiver address and are set with the same transmitter address.

In some embodiments, the AP 14 adds an additional 8-bit transmitted BSSID Unique LSB field (not shown) to the HE Operation element 950. With this additional field, a client STA associated with a VAP whose BSSID is not transmitted BSSID can determine the AID of its associated VAP without receiving a beacon with the associated VAP as the transmitted BSSID. Assume n is the value in received maximum BSSID indicator 956, the client station determines the AIDi of its associated AP according to n LSBs of the associated AP=(n LSBs of the Transmitted BSSID+i) mod $2^n$. With this additional field, a client STA associated with a VAP whose BSSID is not a transmitted BSSID can determine the transmitted BSSID without receiving beacons with the associated VAP as the transmitted BSSID. Assume n is the value in received maximum BSSID indicator 956, the following is the formula for transmitted BSSID configuration: BSSID_A OP_OR BSSID_B, where OP_OR is a Boolean OR operation, BSSID_A is a BSSID with (48−n) MSBs of the reference MU BSSID (obtained from the shared bits of the transmitter address of the management frame 500) concatenated with n LSBs equal to zero, and BSSID_B is a BSSID with (48−n) MSBs equal to zero concatenated with the n LSBs of the transmitted BSSID Unique LSB field.

Figure 10:
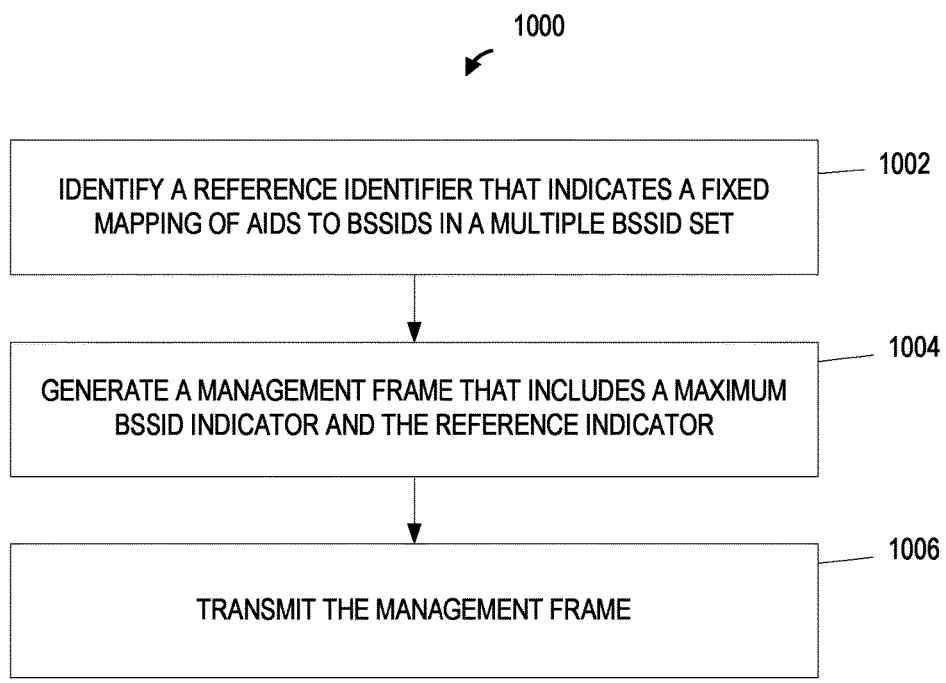
FIG. 10 is a flow diagram of an example method for identifying AIDs for multiple BSSs supported by an access point, according to an embodiment.

FIG. 10 is a flow diagram 1000 of an example method for identifying AIDs for multiple BSSs supported by a first communication device, according to an embodiment. In the embodiment shown in FIG. 10, the first communication device is an access point, for example, the AP 14. In an embodiment, the method 1000 is implemented by a client station in the WLAN, according to an embodiment. With reference to FIG. 1, the method 1000 is implemented by the network interface 27, in an embodiment. For example, in one such embodiment, the PHY processor 29 is configured to implement the method 1000. According to another embodiment, the MAC processing 28 is also configured to implement at least a part of the method 1000. With continued reference to FIG. 1, in yet another embodiment, the method 1000 is implemented by the network interface 16 (e.g., the PHY processor 20 and/or the MAC processor 18). In other embodiments, the method 1000 is implemented by other suitable network interfaces.

At block 1002, a reference identifier that indicates a fixed mapping of AIDs to BSSIDs in a multiple-BSSID set is identified by a first communication device, in an embodiment. In an embodiment, the first communication device is the AP 14. The multiple-BSSID set includes BSSIDs of a first BSS and a second BSS of the multiple BSSs supported by the first communication device, in an embodiment.

At block 1004, a management frame that includes i) a maximum BSSID indicator that indicates a maximum size of the multiple-BSSID set, ii) the reference identifier, and iii) a transmitter address of the management frame is generated by the first communication device, in an embodiment, for a receiver of the management frame (e.g., the client station 25) to derive a first AID corresponding to the first BSS and a second AID corresponding to the second BSS of the management frame based on i) the maximum BSSID indicator, ii) the reference identifier, and iii) the transmitter address of the management frame. In an embodiment, the management frame corresponds to the management frame 500 of FIG. 5A. In another embodiment, the management frame corresponds to the beacon frame 600 of FIG. 6A.

At block 1006, the management frame is transmitted by the first communication device to at least one second communication device associated with one of the first BSS and the second BSS. In an embodiment, the second communication device is a client station 25 (e.g., the receiver of the management frame).

In an embodiment, the maximum BSSID indicator indicates a value n and the maximum size of the multiple-BSSID set is equal to $2^n$. In this embodiment, the (48−n) most significant bits of the transmitter address concatenated with the n least significant bits of the reference identifier identify a reference multi-user (MU) BSSID of the multiple-BSSID set that corresponds to a reference AID. In an embodiment, the management frame is a first management frame and the method 1000 further includes generating a second management frame that includes i) the maximum BSSID indicator, ii) the reference identifier, and iii) a transmitter address of the second management frame and transmitting the second management frame. In this embodiment, the transmitter address of the second management frame is the second BSSID and the first AID and the second AID are derivable by a receiver (e.g., client station 25) of the second management frame based on i) the maximum BSSID indicator, ii) the reference identifier, and iii) the transmitter address of the second management frame. In this embodiment, the AP 14 utilizes the fixed mapping of AIDs to BSSIDs of the multiple-BSSID set, and thus the assigned AID values have improved consistency, even when a beacon frame is not received by a client station, because the AID values are derivable from a beacon frame regardless of which VAP of the multiple-BSSID set transmits the beacon frame. In other words, when i) the first BSSID is a transmitted BSSID and the second BSSID is a nontransmitted BSSID in the first management frame, and ii) the first BSSID is a nontransmitted BSSID and the second BSSID is a transmitted BSSID in the second management frame, the first BSSID corresponds to the first AID and the second BSSID corresponds to the second AID in both the first management frame and the second management frame.

In various embodiments, the management frame is a beacon frame, probe response frame, or association response frame. In an embodiment, the reference identifier indicates an AID that corresponds to the BSS of the multiple-BSSID set that is identified by the transmitter address of the management frame.

In an embodiment, when the reference identifier is zero, a reference MU BSSID of the multiple-BSSID set that corresponds to a reference AID is the transmitter address, and when the reference identifier is non-zero, the reference MU BSSID is a Boolean OR of i) the (48−n) most significant bits of the transmitter address concatenated with n least significant bits equal to zero, and ii) (48−n) most significant bits equal to zero concatenated with n least significant bits equal to (i+$2^n$−n least significant bits of the transmitter address) modulo $2^n$.

In some embodiments, the reference identifier indicates that the BSSID of the multiple-BSSID set that corresponds to the transmitter address is the only BSSID of the multiple-BSSID set that transmits management frames with a Multiple BSSID element that identifies the remaining BSSIDs in the multiple-BSSID set. In one such embodiment, all other VAPs of an AP device do not transmit management frames with the Multiple BSSID element.

In an embodiment, the maximum BSSID indicator indicates a value n and the maximum size of the multiple-BSSID set is equal to $2^n$. In this embodiment, the (48−n) most significant bits of the transmitter address concatenated with the n least significant bits of the reference identifier identify a reference multi-user (MU) BSSID of the multiple-BSSID set that corresponds to a reference AID. In an embodiment, the management frame is a first management frame with a Multiple BSSID element which is transmitted by a single VAP (e.g., the transmitter address of a first management frame is the transmitted BSSID and the reference MU BSSID) and the method 1000 further includes generating a second management frame without the Multiple BSSID element that is transmitted by other VAPs and includes i) the maximum BSSID indicator, ii) Transmitter BSSID Indicator being 0, iii) a transmitter address of the second management frame and transmitting the second management frame. In this embodiment, the transmitter address of the second management frame is the second BSSID and the second AID of the second BSSID is derivable by a receiver (e.g., client station 25) of the second management frame based on i) the maximum BSSID indicator, ii) the transmitter address of the first management frame, and iii) the transmitter address of the second management frame (second BSSID). In this embodiment, the AP 14 utilizes the fixed mapping of AIDs to BSSIDs of the multiple-BSSID set, and thus the assigned AID values have improved consistency.

In an embodiment, the method 1000 further includes: generating, by the first communication device, a trigger frame that includes requests for simultaneous uplink multi-user data units from a plurality of third communication devices, the plurality of third communication devices including communication devices associated with the first BSS and communication devices associated with the second BSS; setting, by the first communication device, the transmitter address of the trigger frame to a reference MU BSSID of the multiple-BSSID set; transmitting, by the first communication device, the trigger frame to the plurality of third communication devices; and receiving, at the first communication device, at least some of the simultaneous uplink multi-user data units from the plurality of third communication devices.

Figure 11:
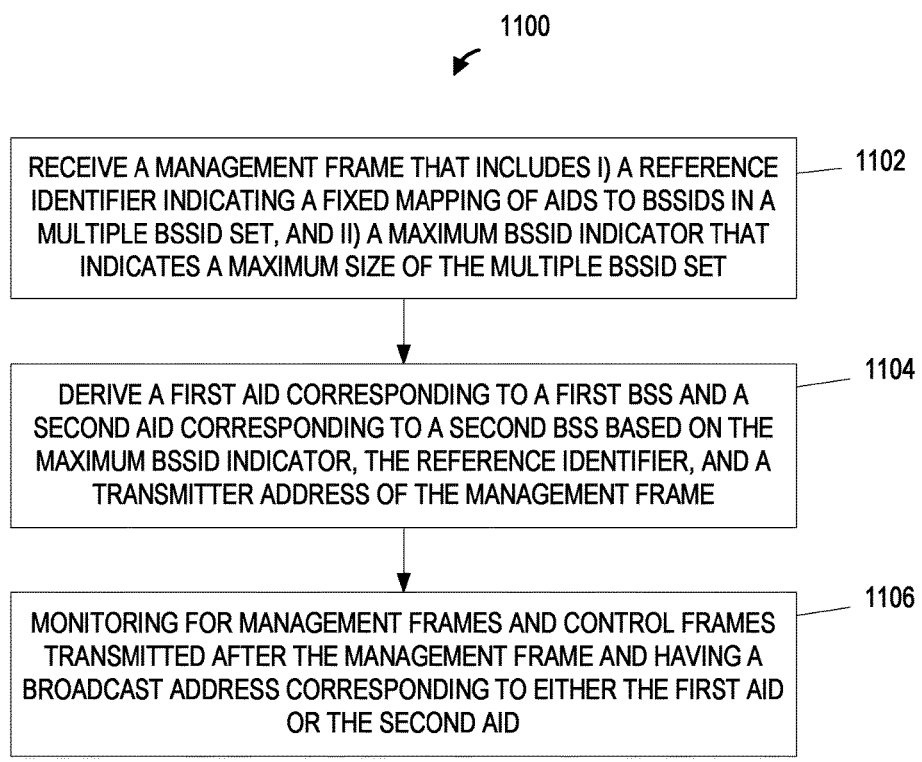
FIG. 11 is a flow diagram of an example method for identifying AIDs for multiple BSSs supported by a client station, according to an embodiment.

FIG. 11 is a flow diagram 1100 of an example method for identifying AIDs for multiple BSSs supported by a first communication device, according to an embodiment. In the embodiment shown in FIG. 11, the first communication device is a client station, for example, the client station 25. In an embodiment, the method 1100 is implemented by a client station in the WLAN, according to an embodiment. With reference to FIG. 1, the method 1100 is implemented by the network interface 27, in an embodiment. For example, in one such embodiment, the PHY processor 29 is configured to implement the method 1100. According to another embodiment, the MAC processing 28 is also configured to implement at least a part of the method 1100. With continued reference to FIG. 1, in yet another embodiment, the method 1100 is implemented by the network interface 16 (e.g., the PHY processor 20 and/or the MAC processor 18). In other embodiments, the method 1100 is implemented by other suitable network interfaces.

At block 1102, a management frame, transmitted by the first communication device, that includes i) a reference identifier indicating a fixed mapping of AIDs to BSSIDs in a multiple-BSSID set, ii) a maximum BSSID indicator that indicates a maximum size of the multiple-BSSID set, and iii) a transmitter address of the management frame, is received at a second communication device, in an embodiment. The multiple-BSSID set includes a first BSSID of a first BSS and a second BSSID of a second BSS of the multiple BSSs supported by the first communication device, in an embodiment. The second communication device is associated with the second BSS and is not associated with the first BSS, in an embodiment. In an embodiment, the first communication device is the AP device 14 and the second communication device is the client station 25. In an embodiment, the management frame corresponds to the management frame 500 of FIG. 5A. In another embodiment, the management frame corresponds to the beacon frame 600 of FIG. 6A.

At block 1104, a first AID corresponding to the first BSS and a second AID corresponding to the second BSS are derived by the second communication device based on i) the maximum BSSID indicator, ii) the reference identifier, and iii) the transmitter address of the management frame, where the transmitter address corresponds to the first BSSID, in an embodiment.

At block 1106, management frames and control frames that i) are intended for the second communication device, ii) are transmitted after the management frame, and iii) have a broadcast address corresponding to one of the first AID and the second AID are monitored for by the second communication device, in an embodiment.

In an embodiment, the method 1100 further includes: receiving, at the second communication device, a control frame that i) solicits a response frame from the second communication device, and ii) has a transmitter address set to the first BSSID; generating, at the second communication device, the response frame solicited by the control frame; setting, at the second communication device, a receiver address of the response frame to the second BSSID; and transmitting, by the second communication device, the response frame to the first communication device.

In an embodiment, the maximum BSSID indicator indicates a value n, the maximum size of the multiple-BSSID set is equal to 2", and monitoring for management frames and control frames includes monitoring for beacon frames having a transmitter address whose (48−n) most significant bits match the (48−n) most significant bits of the second BSSID.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for identifying broadcast association identifiers (AIDs) for multiple basic service sets (BSSs) supported by a first communication device, the method comprising:
   identifying, by the first communication device, a reference identifier that indicates a fixed mapping of broadcast AIDs to basic service set identifiers (BSSIDs) in a multiple-BSSID set, wherein the multiple-BSSID set includes BSSIDs of a first BSS and a second BSS of the multiple BSSs supported by the first communication device, wherein each broadcast AID corresponds to a respective broadcast address for a respective BSS among the multiple BSSs;
   generating, by the first communication device, a management frame that includes i) a maximum BSSID indicator that indicates a maximum size of the multiple-BSSID set, ii) the reference identifier, and iii) a transmitter address of the management frame for a receiver of the management frame to derive a first broadcast AID corresponding to the first BSS and a second broadcast AID corresponding to the second BSS based on i) the maximum BSSID indicator, ii) the reference identifier, and iii) the transmitter address of the management frame; and
   transmitting, by the first communication device, the management frame to at least one second communication device associated with one of the first BSS and the second BSS.

2. The method of claim 1, wherein:
   the maximum BSSID indicator indicates a value n and the maximum size of the multiple-BSSID set is equal to $2^n$;
   the (48−n) most significant bits of the transmitter address and the n least significant bits of the reference identifier identify a reference multi-user (MU) BSSID of the multiple-BSSID set that corresponds to a reference AID.

3. The method of claim 2, wherein:
   the transmitter address is a first BSSID of the first BSS and corresponds to the reference MU BSSID;
   the first broadcast AID corresponds to the reference AID.

4. The method of claim 2, wherein:
   the management frame is a first management frame;
   the method further comprises
      generating, by the first communication device, a second management frame that includes i) the maximum BSSID indicator, ii) the reference identifier, and iii) a transmitter address of the second management frame, and
      transmitting, by the first communication device, the second management frame;
   the transmitter address of the second management frame is the second BSSID; and
   the first broadcast AID and the second broadcast AID are derivable by a receiver of the second management frame based on i) the maximum BSSID indicator, ii) the reference identifier, and iii) the transmitter address of the second management frame.

5. The method of claim 4, wherein:
   the first BSSID is a transmitted BSSID and the second BSSID is a nontransmitted BSSID in the first management frame;
   the first BSSID is a nontransmitted BSSID and the second BSSID is a transmitted BSSID in the second management frame;
   the first BSSID corresponds to the first broadcast AID and the second BSSID corresponds to the second broadcast AID in both the first management frame and the second management frame.

6. The method of claim 2, wherein the management frame is a beacon frame, probe response frame, or association response frame.

7. The method of claim 1, wherein the reference identifier indicates a broadcast AID that corresponds to the BSS of the multiple-BSSID set that is identified by the transmitter address of the management frame.

8. The method of claim 7, wherein:
   when the reference identifier is zero, a reference MU BSSID of the multiple-BSSID set that corresponds to a reference AID is the transmitter address;
   when the reference identifier is non-zero, the reference MU BSSID is a Boolean OR of i) the (48−n) most significant bits of the transmitter address concatenated with n least significant bits equal to zero, and ii) (48−n) most significant bits equal to zero concatenated with n least significant bits equal to (i+$2^n$−n least significant bits of the transmitter address) modulo $2^n$.

9. The method of claim 1, wherein the reference identifier indicates that the BSSID of the multiple-BSSID set that corresponds to the transmitter address is the only BSSID of the multiple-BSSID set that transmits management frames with a Multiple BSSID element that identifies the remaining BSSIDs in the multiple-BSSID set.

10. The method of claim 1, wherein the method further comprises:
generating, by the first communication device, a trigger frame that includes requests for simultaneous uplink multi-user data units from a plurality of third communication devices, the plurality of third communication devices including communication devices associated with the first BSS and communication devices associated with the second BSS;
setting, by the first communication device, the transmitter address of the trigger frame to a reference MU BSSID of the multiple-BSSID set;
transmitting, by the first communication device, the trigger frame to the plurality of third communication devices; and
receiving, at the first communication device, at least some of the simultaneous uplink multi-user data units from the plurality of third communication devices.

11. A first communication device comprising:
a network interface device having one or more integrated circuits configured to
identify a reference identifier that indicates a fixed mapping of broadcast association identifiers (AIDs) to basic service set identifiers (BSSIDs) in a multiple-BSSID set, wherein the multiple-BSSID set includes BSSIDs of a first basic service set (BSS) and a second BSS of multiple BSSs supported by the first communication device, wherein each broadcast AID corresponds to a respective broadcast address for a respective BSS among the multiple BSSs,
generate a management frame that includes i) a maximum BSSID indicator that indicates a maximum size of the multiple-BSSID set, ii) the reference identifier, and iii) a transmitter address of the management frame, for a receiver of the management frame to derive a first broadcast AID corresponding to the first BSS and a second broadcast AID corresponding to the second BSS based on i) the maximum BSSID indicator, ii) the reference identifier, and iii) the transmitter address of the management frame, and
transmit the management frame to at least one second communication device associated with one of the first BSS and the second BSS.

12. The first communication device of claim 11, wherein:
the maximum BSSID indicator indicates a value n and the maximum size of the multiple-BSSID set is equal to $2^n$; and
the (48−n) most significant bits of the transmitter address and the n least significant bits of the reference identifier identify a reference MU BSSID of the multiple-BSSID set that corresponds to a reference AID.

13. The first communication device of claim 12, wherein:
the transmitter address is a first BSSID of the first BSS and corresponds to the reference MU BSSID;
the first broadcast AID corresponds to the reference AID.

14. The first communication device of claim 12, wherein:
the management frame is a first management frame;
the one or more integrated circuits are further configured to
generate a second management frame that includes i) the maximum BSSID indicator, ii) the reference identifier, and iii) a transmitter address of the second management frame, and transmit the second management frame;
the transmitter address of the second management frame is the second BSSID;
the first broadcast AID and the second broadcast AID are derivable by a receiver of the second management frame based on i) the maximum BSSID indicator, ii) the reference identifier, and iii) the transmitter address of the second management frame.

15. The first communication device of claim 14, wherein:
the first BSSID is a transmitted BSSID and the second BSSID is a nontransmitted BSSID in the first management frame;
the first BSSID is a nontransmitted BSSID and the second BSSID is a transmitted BSSID in the second management frame; and
the first BSSID corresponds to the first broadcast AID and the second BSSID corresponds to the second broadcast AID in both the first management frame and the second management frame.

16. The first communication device of claim 12, wherein the management frame is a beacon frame, probe response frame, or association response frame.

17. The first communication device of claim 11, wherein the reference identifier indicates a broadcast AID that corresponds to the BSS of the multiple-BSSID set that is identified by the transmitter address of the management frame.

18. The first communication device of claim 17, wherein:
when the reference identifier is zero, a reference MU BSSID of the multiple-BSSID set that corresponds to a reference AID is the transmitter address; and
when the reference identifier is non-zero, the reference MU BSSID is a Boolean OR of i) the (48−n) most significant bits of the transmitter address concatenated with n least significant bits equal to zero, and ii) (48−n) most significant bits equal to zero concatenated with n least significant bits equal to (i+$2^n$−n least significant bits of the transmitter address) modulo $2^n$.

19. The first communication device of claim 11, wherein the reference identifier indicates that the BSSID of the multiple-BSSID set that corresponds to the transmitter address is the only BSSID of the multiple-BSSID set that transmits management frames with a Multiple BSSID element that identifies the remaining BSSIDs in the multiple-BSSID set.

20. The first communication device of claim 11, wherein the one or more integrated circuits are further configured to:
generate a trigger frame that includes requests for simultaneous uplink multi-user data units from a plurality of third communication devices, the plurality of third communication devices including communication devices associated with the first BSS and communication devices associated with the second BSS;
set the transmitter address of the trigger frame to a reference MU BSSID of the multiple-BSSID set; and
transmit the trigger frame to the plurality of third communication devices; and
receiving, at the first communication device, at least some of the simultaneous uplink multi-user data units from the plurality of third communication devices.

21. A method for identifying respective association identifiers (AIDs) for multiple basic service sets (BSSs) supported by a first communication device, the method comprising:
receiving, at a second communication device, a management frame, transmitted by the first communication device, that includes i) a reference identifier indicating a fixed mapping of AIDs to basic service set identifiers (BSSIDs) in a multiple-BSSID set, ii) a maximum BSSID indicator that indicates a maximum size of the multiple-BSSID set, and iii) a transmitter address of the management frame, wherein
    the multiple-BSSID set includes a first BSSID of a first BSS and a second BSSID of a second BSS of the multiple BSSs supported by the first communication device, and
    the second communication device is associated with the second BSS and is not associated with the first BSS;
deriving, by the second communication device, a first AID corresponding to the first BSS and a second AID corresponding to the second BSS based on i) the maximum BSSID indicator, ii) the reference identifier, and iii) the transmitter address of the management frame, wherein the transmitter address corresponds to the first BSSID; and
monitoring, by the second communication device, for management frames and control frames that i) are intended for the second communication device, ii) are transmitted after the management frame, and iii) have a broadcast address corresponding to one of the first AID and the second AID.

22. The method of claim 21, the method further comprising:
receiving, at the second communication device, a control frame that i) solicits a response frame from the second communication device, and ii) has a transmitter address set to the first BSSID;
generating, at the second communication device, the response frame solicited by the control frame;
setting, at the second communication device, a receiver address of the response frame to the second BSSID; and
transmitting, by the second communication device, the response frame to the first communication device.

23. The method of claim 21, wherein:
the maximum BSSID indicator indicates a value n and the maximum size of the multiple-BSSID set is equal to $2^n$; and
monitoring for management frames and control frames comprises monitoring for beacon frames having a transmitter address whose (48−n) most significant bits match the (48−n) most significant bits of the second BSSID.

24. A first communication device, comprising:
a network interface device having one or more integrated circuits configured to:
    receive a management frame, transmitted by a second communication device, that includes i) a reference identifier indicating a fixed mapping of association identifiers (AIDs) to basic service set identifiers (BSSIDs) in a multiple-BSSID set, ii) a maximum BSSID indicator that indicates a maximum size of the multiple-BSSID set, and iii) a transmitter address of the management frame, wherein
        the multiple-BSSID set includes a first BSSID of a first basic service set (BSS) and a second BSSID of a second BSS of the multiple BSSs supported by the second communication device, and
        the first communication device is associated with the second BSS and is not associated with the first BSS;
    wherein the one or more integrated circuits are further configured to:
        derive a first AID corresponding to the first BSS and a second AID corresponding to the second BSS based on i) the maximum BSSID indicator, ii) the reference identifier, and iii) the transmitter address of the management frame, wherein the transmitter address corresponds to the first BSSID, and
        monitor for management frames and control frames that i) are intended for the first communication device, ii) are transmitted after the management frame, and iii) have a broadcast address corresponding to one of the first AID and the second AID.

25. The first communication device of claim 24, wherein the one or more integrated circuits are further configured to:
receive a control frame that i) solicits a response frame from the second communication device, and ii) has a transmitter address set to the first BSSID;
generate the response frame solicited by the control frame;
set a receiver address of the response frame to the second BSSID; and
transmit the response frame to the second communication device.

26. The method of claim 24, wherein:
the maximum BSSID indicator indicates a value n and the maximum size of the multiple-BSSID set is equal to $2^n$; and
the one or more integrated circuits are further configured to monitor for beacon frames having a transmitter address whose (48−n) most significant bits match the (48−n) most significant bits of the second BSSID.

\* \* \* \* \*